(12) United States Patent
Abel et al.

(10) Patent No.: US 11,587,277 B2
(45) Date of Patent: Feb. 21, 2023

(54) WEIGHT MAPS TO GENERATE OFF-CENTER SPLIT MAPS OF A SHAPE

(71) Applicant: Sony Interactive Entertainment LLC, San Mateo, CA (US)

(72) Inventors: Rebecca Abel, Longmont, CO (US); Matthew J. Cioffi, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/180,544

(22) Filed: Feb. 19, 2021

(65) Prior Publication Data

US 2022/0189092 A1 Jun. 16, 2022

Related U.S. Application Data

(60) Provisional application No. 63/126,484, filed on Dec. 16, 2020, provisional application No. 63/126,480, filed on Dec. 16, 2020.

(51) Int. Cl.
| | |
|---|---|
| *G06T 13/40* | (2011.01) |
| *G06T 19/20* | (2011.01) |
| *G06T 17/20* | (2006.01) |
| *G06N 20/00* | (2019.01) |

(52) U.S. Cl.
CPC ............ *G06T 13/40* (2013.01); *G06N 20/00* (2019.01); *G06T 17/20* (2013.01); *G06T 17/205* (2013.01); *G06T 19/20* (2013.01); *G06T 2219/2004* (2013.01); *G06T 2219/2012* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2019/0362529 | A1* | 11/2019 | Wedig | G06T 13/40 |
| 2021/0042981 | A1* | 2/2021 | Bisceglio | G06T 13/40 |
| 2021/0241510 | A1* | 8/2021 | Kuribayashi | G06T 7/75 |
| 2022/0172383 | A1* | 6/2022 | Takashima | G06T 7/50 |

FOREIGN PATENT DOCUMENTS

JP 2019204476 A * 11/2019

* cited by examiner

*Primary Examiner* — Sultana M Zalalee
(74) *Attorney, Agent, or Firm* — Penilla IP, APC

(57) ABSTRACT

A method for generating split-shapes. The method including generating a three dimensional (3D) wire frame of a shape that corresponds to an expression of a face. The method including generating a UV map that corresponds to the 3D wire frame. The method including identifying an isolated area of the shape using vertex weights or the UV map, wherein the isolated area corresponds to a portion of the face. The method including generating a weight map based on the vertex weights or the UV map, wherein the weight map identifies the isolated area. The method including generating a sub-shape of the shape based on the weight map, wherein the sub-shape is editable using an editing application.

20 Claims, 22 Drawing Sheets

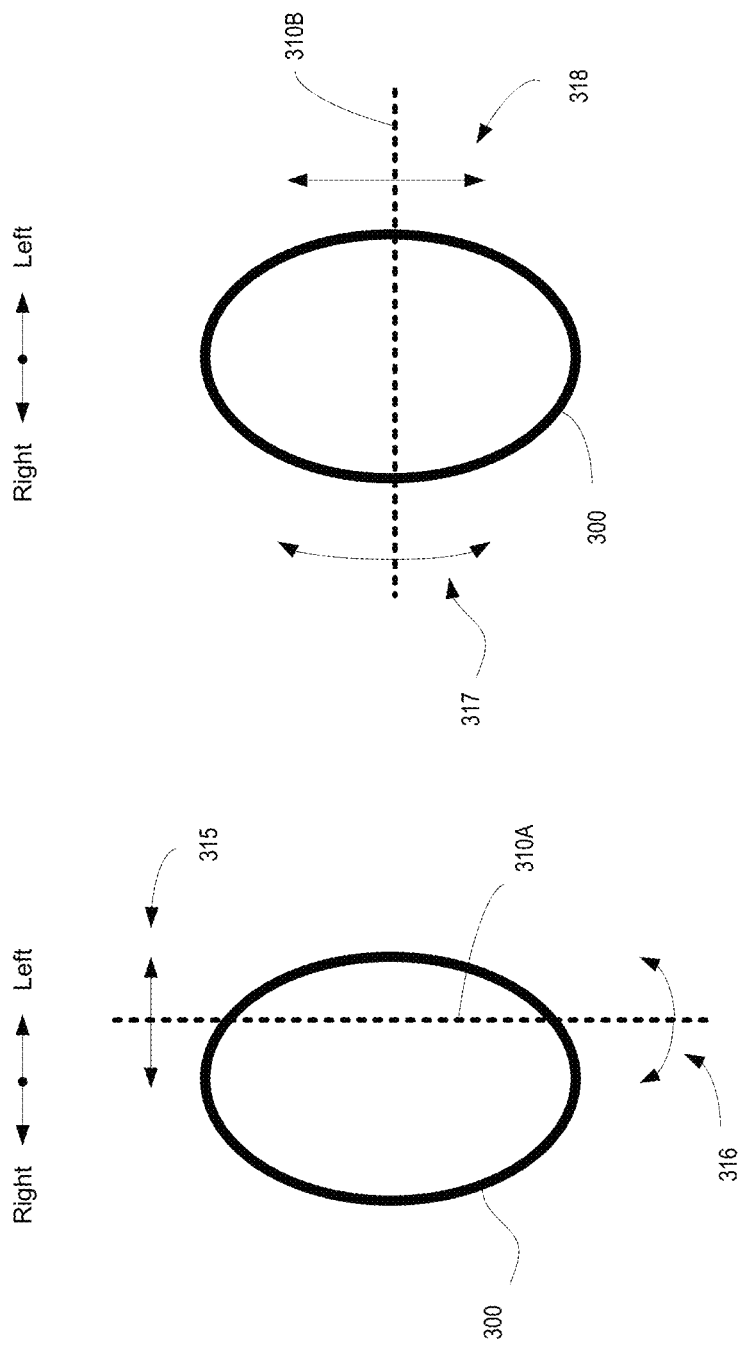

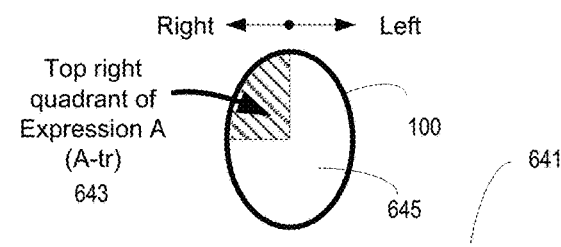
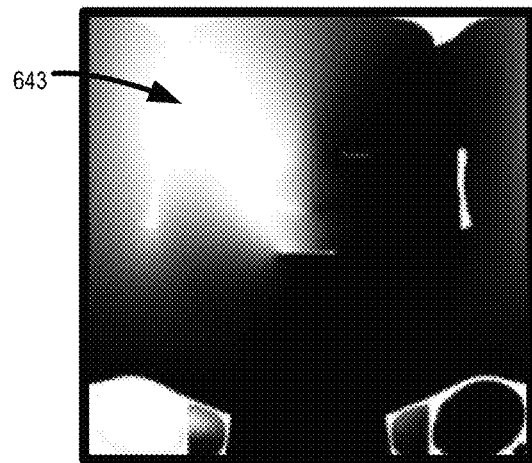
FIG. 6E
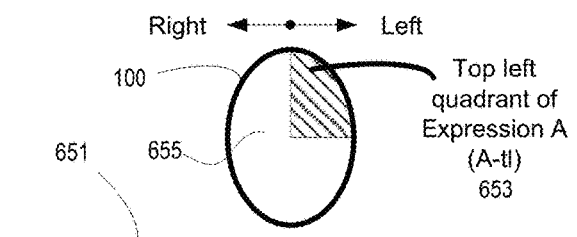
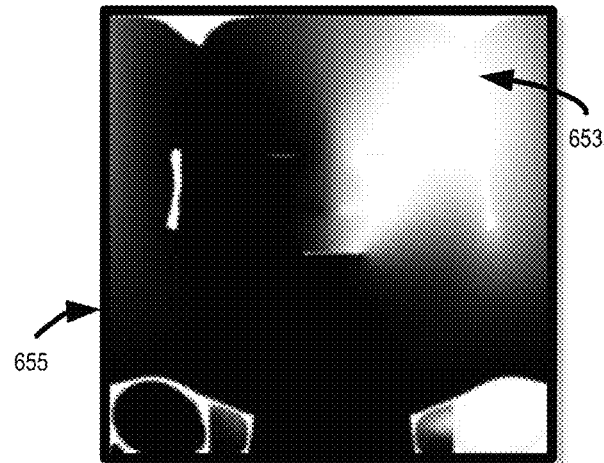
FIG. 6F
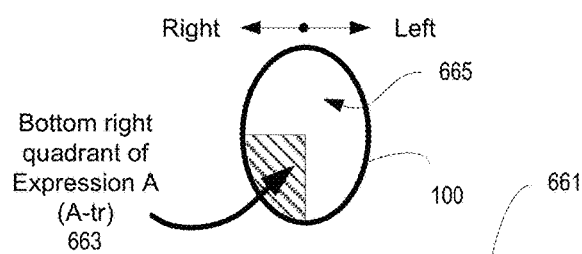
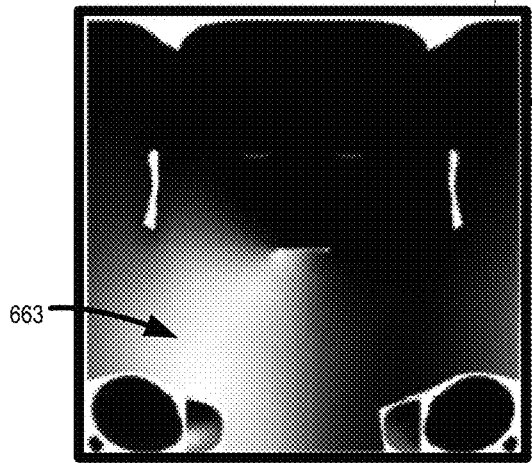
FIG. 6G
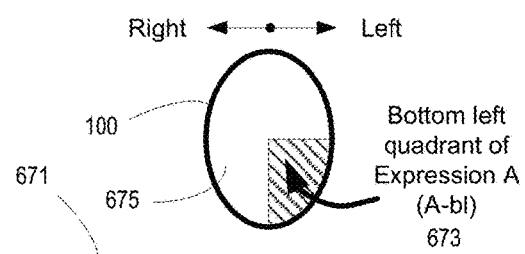
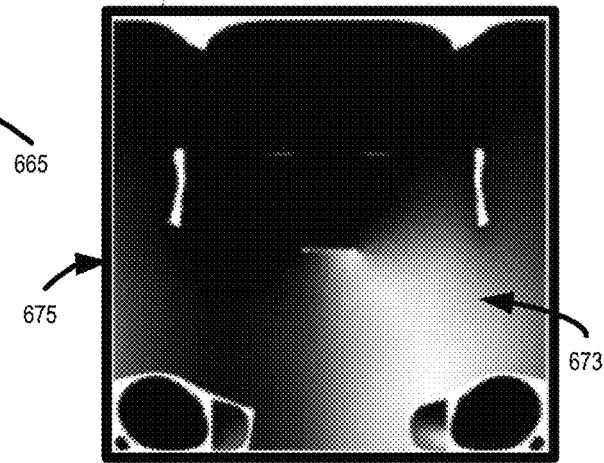
FIG. 6H

WEIGHT MAPS TO GENERATE OFF-CENTER SPLIT MAPS OF A SHAPE

CLAIM OF PRIORITY

The present application claims priority to and the benefit of the commonly owned, provisional patent application, U.S. Ser. No. 63/126,480, filed on Dec. 16, 2020, entitled "WEIGHT MAPS TO GENERATE OFF-CENTER SPLIT MAPS OF A SHAPE"; and claims priority to and the benefit of the commonly owned, provisional patent application, U.S. Ser. No. 63/126,484, filed on Dec. 16, 2020, entitled "POST-SPLIT CONTRALATERAL COMBINATIONS," the disclosures of which are herein incorporated by reference in their entireties for all purposes.

TECHNICAL FIELD

The present disclosure is related to computer animation, and more specifically to performing an off-center split of a shape of an object for purposes of editing, and the combining of multiple split-shapes of two or more objects with modifications and corrections.

BACKGROUND OF THE DISCLOSURE

Object animation allows a computer animator to give movement and life to an object. For example, a face of a character can be given a range of poses that each describes a different expression for the face. Unfortunately, generating a new expression can be time consuming as the animator needs to manipulate one or more vertices of a mesh corresponding to the object. Generating multiple expressions through mesh manipulation would require a large investment in time that the animator may not have given deadlines and budget for a given project.

Certain animation tools are designed to speed up the animation process. However, these animation tools are limited in their applications. In particular, only certain types of expressions can be used for mixing and manipulation, which ultimately hinders the ability of the animator to generate new and wanted expressions. Instead of expanding the realm of expressions that can be used to animate a character, these animation tools actually limit the types of expressions that can be generated such that all the expressions of different characters that are generated by different animators tend to have the same types of expressions.

What is needed is for the generation of new expressions without being constrained by the limitations of existing animation tools.

It is in this context that embodiments of the disclosure arise.

SUMMARY

Embodiments of the present disclosure relate to systems and methods for splitting a shape of an object into unique off-center and customized sub-shapes that can be used for editing and combining, and for performing post-split corrections to shapes and sub-shapes of different expressions that are combined. In embodiments, an artificial intelligence (AI) model is configured to identify corrections that are applied to shapes and sub-shapes that are combined based on training data of corrections that are manually and or automatically made when combining shapes and sub-shapes during training. In other embodiments, the AI model is used to identify which types of expressions are exhibited by an object, such as a face of a character used during animation.

In one embodiment, a method for animation is disclosed. The method including generating a three dimensional (3D) wire frame of a shape that corresponds to an expression of a face. The method including generating a UV map that corresponds to the 3D wire frame. The method including identifying an isolated area of the shape using vertex weights or the UV map, wherein the isolated area corresponds to a portion of the face. The method including generating a weight map based on the vertex weights or the UV map, wherein the weight map identifies the isolated area. The method including generating a sub-shape of the shape based on the weight map, wherein the sub-shape is editable using an editing application.

In another embodiment, a non-transitory computer-readable medium storing a computer program for implementing a method for animation is disclosed. The computer-readable medium including program instructions for generating a three dimensional (3D) wire frame of a shape that corresponds to an expression of a face. The computer-readable medium including program instructions for generating a UV map that corresponds to the 3D wire frame. The computer-readable medium including program instructions for identifying an isolated area of the shape using vertex weights or the UV map, wherein the isolated area corresponds to a portion of the face. The computer-readable medium including program instructions for generating a weight map based on the vertex weights or the UV map, wherein the weight map identifies the isolated area. The computer-readable medium including program instructions for generating a sub-shape of the shape based on the weight map, wherein the sub-shape is editable using an editing application.

In still another embodiment, a computer system is disclosed, wherein the computer system includes a processor and memory coupled to the processor and having stored therein instructions that, if executed by the computer system, cause the computer system to execute a method for animation. The method including generating a three dimensional (3D) wire frame of a shape that corresponds to an expression of a face. The method including generating a UV map that corresponds to the 3D wire frame. The method including identifying an isolated area of the shape using vertex weights or the UV map, wherein the isolated area corresponds to a portion of the face. The method including generating a weight map based on the vertex weights or the UV map, wherein the weight map identifies the isolated area. The method including generating a sub-shape of the shape based on the weight map, wherein the sub-shape is editable using an editing application.

In still another embodiment, another method for animation is disclosed. The method including generating a first sub-shape of a first shape that corresponds to a first expression of a face, wherein the first sub-shape corresponds to a first portion of the face. The method including generating a second sub-shape of a second shape that corresponds to a second expression of the face, wherein the second sub-shape corresponds to a second portion of the face. The method including modifying the first sub-shape. The method including generating a combined shape by combining the first sub-shape that is modified and the second sub-shape using an editing application. The method includes applying a correction to the combined shape to align relative portions of the combined shape with the first shape or the second shape.

In another embodiment, a non-transitory computer-readable medium storing a computer program for implementing a method for animation is disclosed. The computer-readable medium including program instructions for generating a first sub-shape of a first shape that corresponds to a first expression of a face, wherein the first sub-shape corresponds to a first portion of the face. The computer-readable medium including program instructions for generating a second sub-shape of a second shape that corresponds to a second expression of the face, wherein the second sub-shape corresponds to a second portion of the face. The computer-readable medium including program instructions for modifying the first sub-shape. The computer-readable medium including program instructions for generating a combined shape by combining the first sub-shape that is modified and the second sub-shape using an editing application. The computer-readable medium including program instructions for applying a correction to the combined shape to align relative portions of the combined shape with the first shape or the second shape.

In still another embodiment, a computer system is disclosed, wherein the computer system includes a processor and memory coupled to the processor and having stored therein instructions that, if executed by the computer system, cause the computer system to execute a method for animation. The method including generating a first sub-shape of a first shape that corresponds to a first expression of a face, wherein the first sub-shape corresponds to a first portion of the face. The method including generating a second sub-shape of a second shape that corresponds to a second expression of the face, wherein the second sub-shape corresponds to a second portion of the face. The method including modifying the first sub-shape. The method including generating a combined shape by combining the first sub-shape that is modified and the second sub-shape using an editing application. The method includes applying a correction to the combined shape to align relative portions of the combined shape with the first shape or the second shape.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 3A-3B are illustrations of off-center splitting of a shape of an object, in accordance with embodiments of the present disclosure.

FIG. 4A-2 illustrates the isolation of the same portion of the shape introduced in FIG. 4A-1 through the painting of vertices of a corresponding UV map, in accordance with one embodiment of the disclosure.

FIG. 4B-1 illustrates the isolation of top and bottom portions of a mouth of a shape of an object through the painting of vertices of a 3D wire frame, in accordance with one embodiment of the disclosure.

FIG. 4B-2 illustrates the isolation of the same top and bottom portions of the mouth introduced in FIG. 4B-1 through the painting of vertices of a corresponding UV map, in accordance with one embodiment of the disclosure.

FIGS. 6A-6H illustrate a base set of weight maps of a shape of an object, wherein each weight map identifies a corresponding portion of a shape of an object that can be manipulated in isolation from other portions of the shape using an editing application or platform, in accordance with embodiments of the present disclosure.

DETAILED DESCRIPTION

Figure 1B:
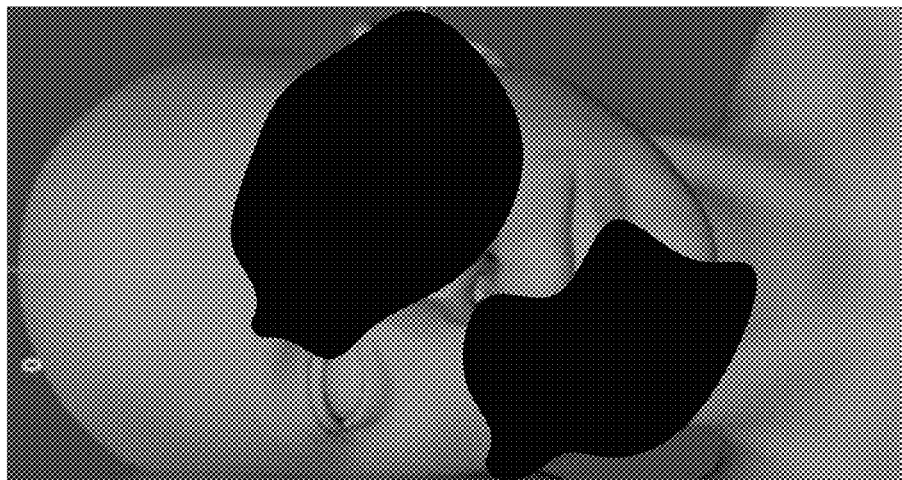
FIG. 1B is an illustration of the object of FIG. 1A that is a face, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for splitting a shape into parts in order to isolate movements. For example, a shape associated with a smile of a face can be split into left and right portions of a smile, and be used to generate a left sided smirk or a right sided smirk. In embodiments of the present disclosure, a shape can be split using weight maps, such that the split of a shape can be generated using a separator that is off-center. In that manner, the split-shape can be a left portion, a right portion, a top portion, a bottom portion, a quadrant portion, or a customized portion (e.g., a splotch on the shape). In one embodiment, split-shape can be identified by painting vertices of a wire frame or a UV map of a corresponding shape, such that a falloff across the portion (e.g., the area of isolation) can be painted rather than using a straight algorithmic falloff from a center line, as previously implemented in traditional systems. In other embodiments, post-split contralateral combinations are corrected. In particular, for general post-split operations, when an animator makes a post-split correction to one split-shape, a correction is made to reunify that split-shape back to an original unsplit state, when combining that split-shape with another split-shape (e.g., when activating both sides of an object). Furthermore, a combination of split-shapes includes combinations of different expressions for different portions of a split (e.g., split-shapes from different sides of an object), such as a smile on one side of a face and a pucker on the other side of a face. In particular, the corrections may use one or more rules to drive the corrections. In embodiments, the rules and/or corrections may be determined through mathematical models, or equations, or through machine learning, or through training of an AI model, etc. The rules can determine what corrections to apply when specific shapes are combined (e.g., fifty percent activation of a jawOpen shape combined with one hundred percent activation of a lipPucker shape. In addition, a correction can be activated (e.g., to be applied to a combined shape) with a weighting (e.g., in what amounts, as selected by a user. In some embodiments, artificial intelligence (AI) techniques are implemented to train and/or build a machine learning model configured to identify and determine the corrections to be applied with combining shapes and/or split-shapes of one or more shapes of one or more objects. In other embodiments, AI techniques are implemented to train and/or build a machine learning model configured to classify a specific shape, such as the expressions of a face.

Advantages of a system configured to apply corrections to shapes and/or sub-shapes of one or more shapes of one or more objects include the generation of many more shapes, such as expressions of a face. In particular, instead of splitting a face vertically down the center of the face to obtain two sides of a face used for generating expressions, the face may be split into any number (e.g., two or more) of off-center portions of the face, wherein the portions may be customized to any portion of the face. In that manner, there are generated many more customized sub-shapes of the face that can be individually manipulated and combined with other sub-shapes of the face to generate a much larger number of unique expressions than could be previously generated. As such, new expressions can be generated thereby distinguishing a character from the many other characters that previously used the same expressions. Furthermore, the use of artificial intelligence to determine corrections to be applied when combining shapes and/or sub shapes complements the increase in the number of combinations without having to manually apply those corrections.

Throughout the specification, the reference to a shape (e.g., a 3D wire frame) may correspond to any object. However, for ease of illustration, embodiments of the present disclosure may be described with reference to an object that is a face, wherein shapes of the face may correspond to different poses of the face, wherein each pose corresponds to a different expression of the face. In addition, embodiments of the present disclosure may be implemented on top of or in conjunction with any number of editing application or platforms that are configured for manipulating and/or generating shapes of objects.

With the above general understanding of the various embodiments, example details of the embodiments will now be described with reference to the various drawings.

Off-Center Split/Weight Maps of a Shape

Figure 1A:
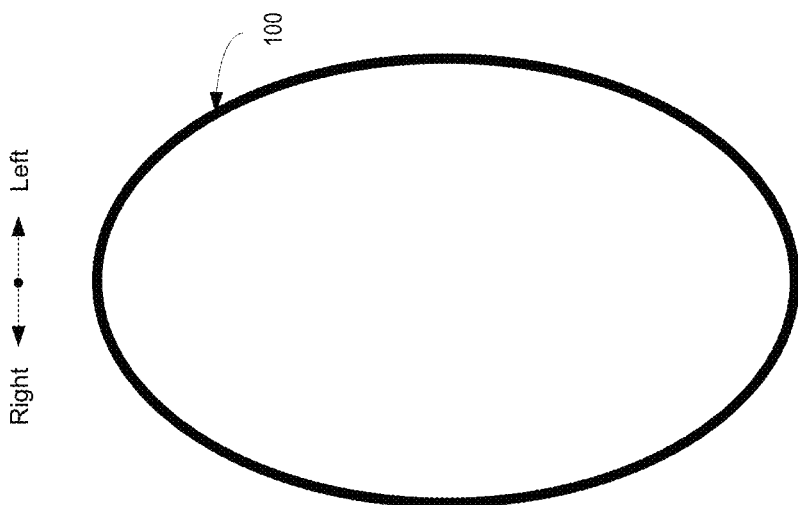
FIG. 1A is an illustration of an object, in accordance with one embodiment of the disclosure.

FIGS. 1A-1D illustrate various representations of an object that can be split into multiple split-shapes or split maps, wherein the split-shapes can be manipulated and/or edited using an editing platform or application. In particular, FIG. 1A is an illustration of a generic object 100, in accordance with one embodiment of the disclosure. Embodiments of the present disclosure may be applied to any object to include the splitting of a shape of an object into one or more sub-shapes, each of which is individually controllable when combining shapes and/or sub-shapes when using an editing platform.

FIG. 1B is an illustration of an object 100B that is a face of a character, in accordance with one embodiment of the disclosure. That is, the generic object 100 of FIG. 1A may be the face shown in FIG. 1B, wherein general features of the face include two eyes, a nose, a mouth, a chin, and two ears. As shown, the face may have an expression, such as a neutral expression from which multiple expressions may be based.

Figure 1C:
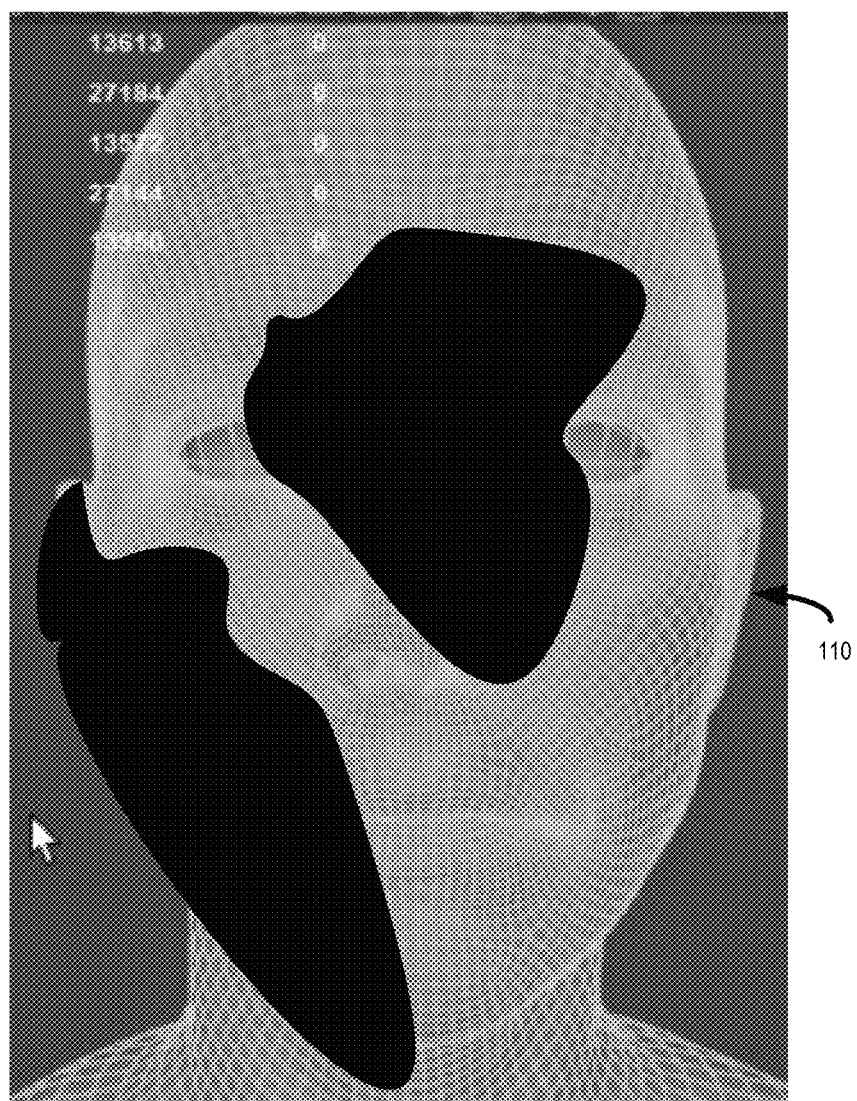
FIG. 1C is an illustration of a wire frame of a shape of the object of FIG. 1B, in accordance with one embodiment of the disclosure.

FIG. 1C is an illustration of a shape 100C of the object 100B introduced in FIG. 1B, in accordance with one embodiment of the disclosure. In particular, the shape 100C may represent a 3D wire frame of the object. As shown, the 3D wire frame illustrates the general features of the underlying face, including the eyes, the nose, and the mouth. As shown, ear 110 on the left side of the face is highlighted. Further, the 3D wire frame may be manipulated by a user via any number of editing applications and/or platforms available within the industry. For example, manipulation of the wire frame may be achieved by moving vertices within the wire frame to obtain a modified shape (e.g., a desired expression), and further by defining values for those vertices. For illustration, the eyes, nose, and/or mouth may be manipulated to generate new expressions of the underlying face.

Figure 1D:
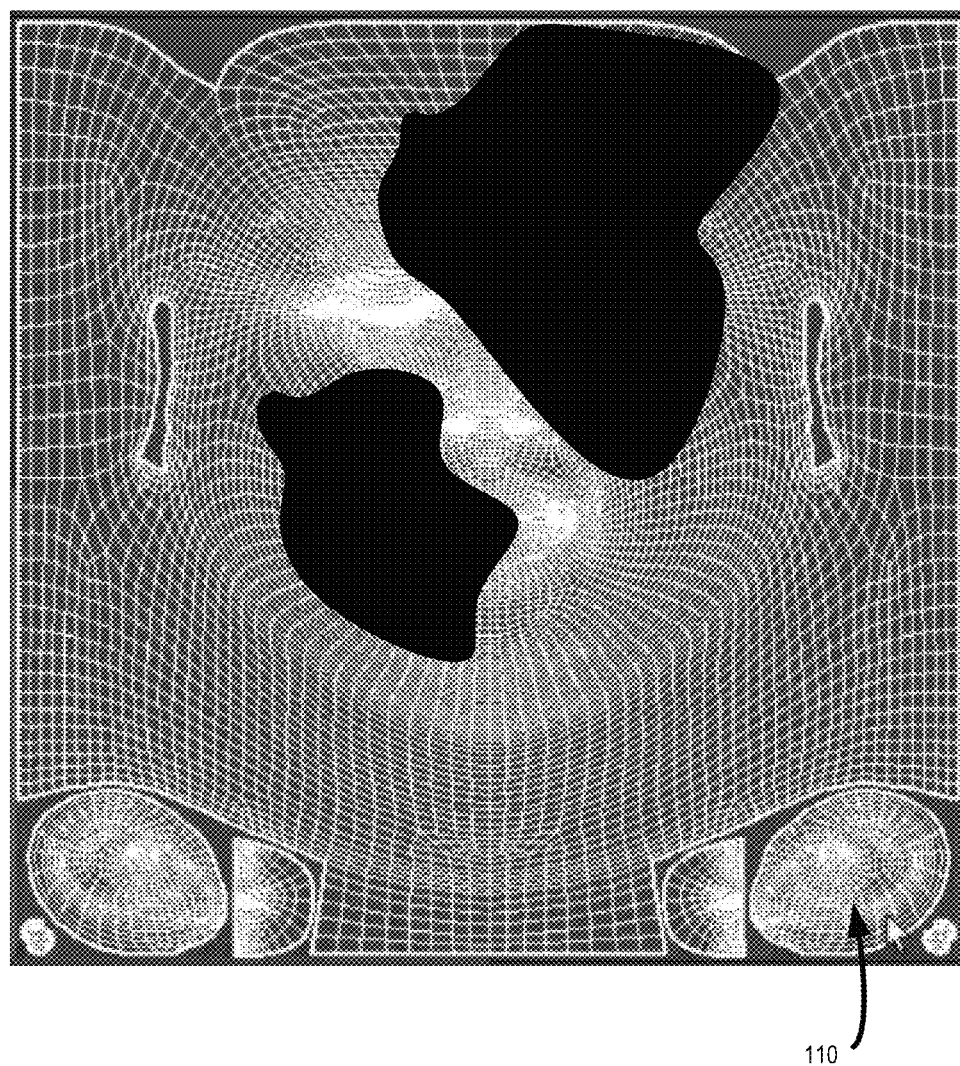
FIG. 1D is an illustration of a UV map of the shape introduced in FIG. 1C, wherein the UV map is projected in a two-dimensional (2D) "U" and "V" space that corresponds to a three-dimensional (3D) space provided in the wire frame of the shape of FIG. 1C, in accordance with one embodiment of the disclosure.

FIG. 1D is an illustration of a UV map 100D of the shape 100C introduced in FIG. 1C, in accordance with one embodiment of the disclosure. In particular, the UV map 100D corresponds to the wire frame of the shape 100C (e.g., of a face). That is, the UV map is projected in a two dimensional "U" and "V" space that corresponds to a three-dimensional (3D) space (i.e., "x", "y", and "z" coordinates) provided in the wire frame of the shape 100C. The UV map 100D includes the same eyes, nose, mouth and ears. However, because the UV map is not a straight projection of the corresponding wire frame, portions of the wire frame may be placed anywhere within the UV space. For example, the ears of the face may be placed at the bottom of the UV map and separate from the other features of the face. As shown, ear 110 on the left side of the shape is moved to the bottom of the UV map. That is, instead of showing the ears in a straight projection where the ears may be hidden beneath other features of the face, the ears are moved away from the other features in the UV space. Just as the 3D wire frame may be manipulated, the UV map 100D may also be manipulated by the user via any number of editing applications and/or platforms available within the industry. For example, manipulation of the UV map 100D may be achieved by moving vertices within the UV map to obtain a modified shape (e.g., a desired expression), and further by defining values for those vertices. More particularly, vertices in the wire frame of a shape of an object correspond to vertices in the corresponding UV map of that shape of the object.

Figure 2:
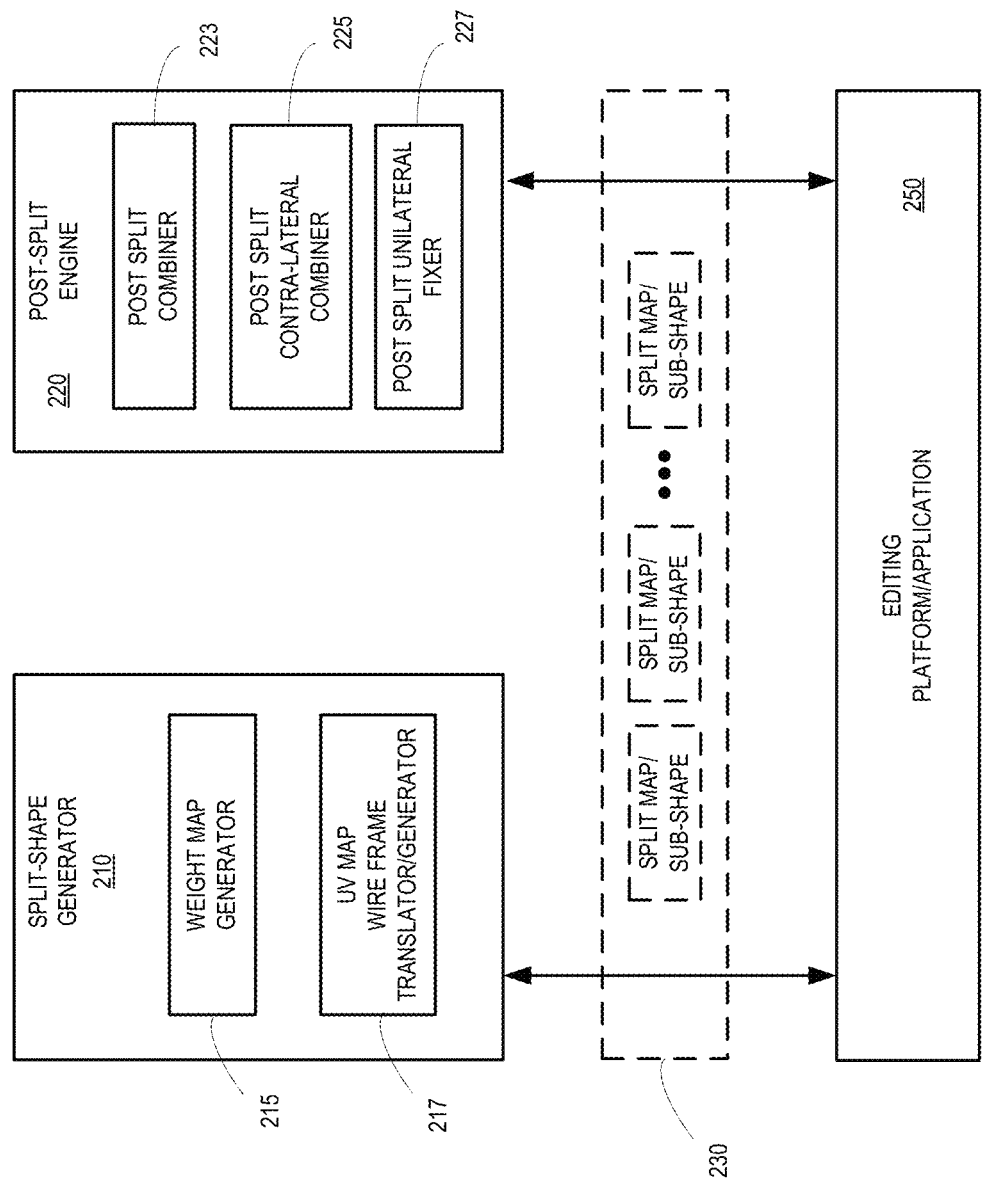
FIG. 2 illustrates a system configured to split a shape of an object into unique off-center and customized sub-shapes for editing purposes, and for performing post-split corrections to shapes and sub-shapes of different expressions that are combined, in accordance with embodiments of the present disclosure.

FIG. 2 illustrates a system 200 configured to split a shape of an object into unique off-center and customized sub-shapes for editing purposes, and for performing post-split corrections to shapes and/or sub-shapes (e.g., of one or more shapes) that are combined, in accordance with embodiments of the disclosure. In particular, the split-shape generator 210 is configured for splitting a shape of an object into one or more sub-shapes for editing purposes, and the post-split engine 220 is configured for performing post-split corrections when combining the shapes and/or sub-shapes (e.g., of one or more expressions of a face).

As shown, implementation of the split-shape generator 210 and the post-split engine 220 may be implemented in conjunction with and on top of an editing platform and or application 250. For example, the editing platform 250 is configured to manipulate, edit, and/or combine shapes and/ or portions of sub-shapes generated through embodiments of the present disclosure. That is, tools implementing the capabilities of embodiments of the present disclosure may be built on the capabilities of the editing platform 250. For example, shapes and sub-shapes generated through embodiments of the present disclosure may be combined using the editing platform 250. Thereafter, embodiments of the present disclosure may perform additional corrections to the combined shapes.

In particular, the split-shape generator 210 includes a weight map generator 215 that is configured identify portions of a shape of an object using weight maps that are based off of UV maps of the shape, previously introduced. In particular, a shape of an object may be represented by a 3D wire mesh and a corresponding UV map, wherein there is a one to one correspondence of vertices in the 3D wire mesh and the UV map. As will be further described below in relation to FIGS. 4A-1, 4A-2, 4B-1, and 4B-2, a portion of a shape may be identified by painting a corresponding 3D wire mesh or UV map, or any other appropriate mapping structure of a shape. The identified portion of the shape may be illustrated in a weight map that is based on the corresponding UV map of the shape. Using the UV map and wire frame translator/generator 217, the weight map may be transformed into a 3D wire frame and/or a corresponding UV map representing a split-map. A split-map may also be referred to as a sub-shape. As such, a plurality of portions of a shape corresponds to a plurality of split-maps or sub-shapes 230. Each of the 3D wire frame and the corresponding UV map (i.e., as a sub-shape) may be used to manipulate and/or edit in isolation the portion of the shape previously identified. That is, the identified portion of the shape may be manipulated in isolation of other portions of the shape, such as when using the editing platform 250 to edit the corresponding split-map or corresponding sub-shape.

The post-split engine includes a post-split combiner 223 that is configured to combine two or more shapes and/or sub-shapes. In particular, post splitting a shape into multiple sub-shapes, the post-split combiner 223 is configured to combine shapes, sub-shapes, or a combination thereof to generate a combined shape. For example, portions of an expression on a face may be manipulated and/or combined using the post-split combiner. The post-split contralateral combiner 225 is configured to combine two or more sub-shapes generated from different shapes to generate a combined shape, such as when combining different expressions (i.e., portions thereof) on different sides of a split (e.g., different sides of a face that is split in half along a central vertical line). The combined shape is further manipulated by the post-split unilateral fixer 227 that is configured to apply a correction to the combined shape to reunify the combined shape back to the original unsplit state. That is, the relevant portions of the combined shape (i.e., relevant portions of the sub-shapes) within the combined shape are aligned with their corresponding shapes in their unsplit states. As such, when the underlying editing platform 250 generates a combined shape that may look unnatural, the post-split unilateral fixer 227 makes corrections to the combined shape to make it look more natural.

FIGS. 3A-3B are illustrations of off-center splitting of a shape of an object, in accordance with embodiments of the present disclosure. In particular, a shape 300 of an object, such as a 3D wire frame of a face having an expression, may be split into multiple portions. In embodiments, the split is performed off-center, such that portions of the shape 300 need not be split along a central and vertical line. For example, in FIG. 3A, vertical line 310A splits the shape 300 into two portions, such as a left side and a right side. The line 310A may be moved to the left and right away from the center of the object, as is shown by bi-directional arrow 315. In addition, line 310A may be rotated such that the line 310A may be angled across the shape 300, as is shown by the bi-directional rotation arrow 316. In addition, in FIG. 3B, horizontal line 310B is shown and splits the shape 300 into two portions, such as a top portion and a bottom portion. The line 310B may be moved up and down across the shape 300, as is shown by bi-directional arrow 318. In addition, line 310B may be rotated such that line 310B may be angled across the shape 300, as is shown by the bi-directional rotation arrow 317.

It is understood that shape 300 may be split into any number of sub-shapes, each identifying a portion of the shape that may be unique and customized That is, the partitioning of the shape 300 need not be defined with a straight line, but by any separator to define a portion of the shape that may be customized. The generation of a sub-shape that has a customized portion of a shape is further described in relation to FIGS. 4A-1, 4A-2, 4B-1, and 4B-2 below.

Figures 1, 4A:
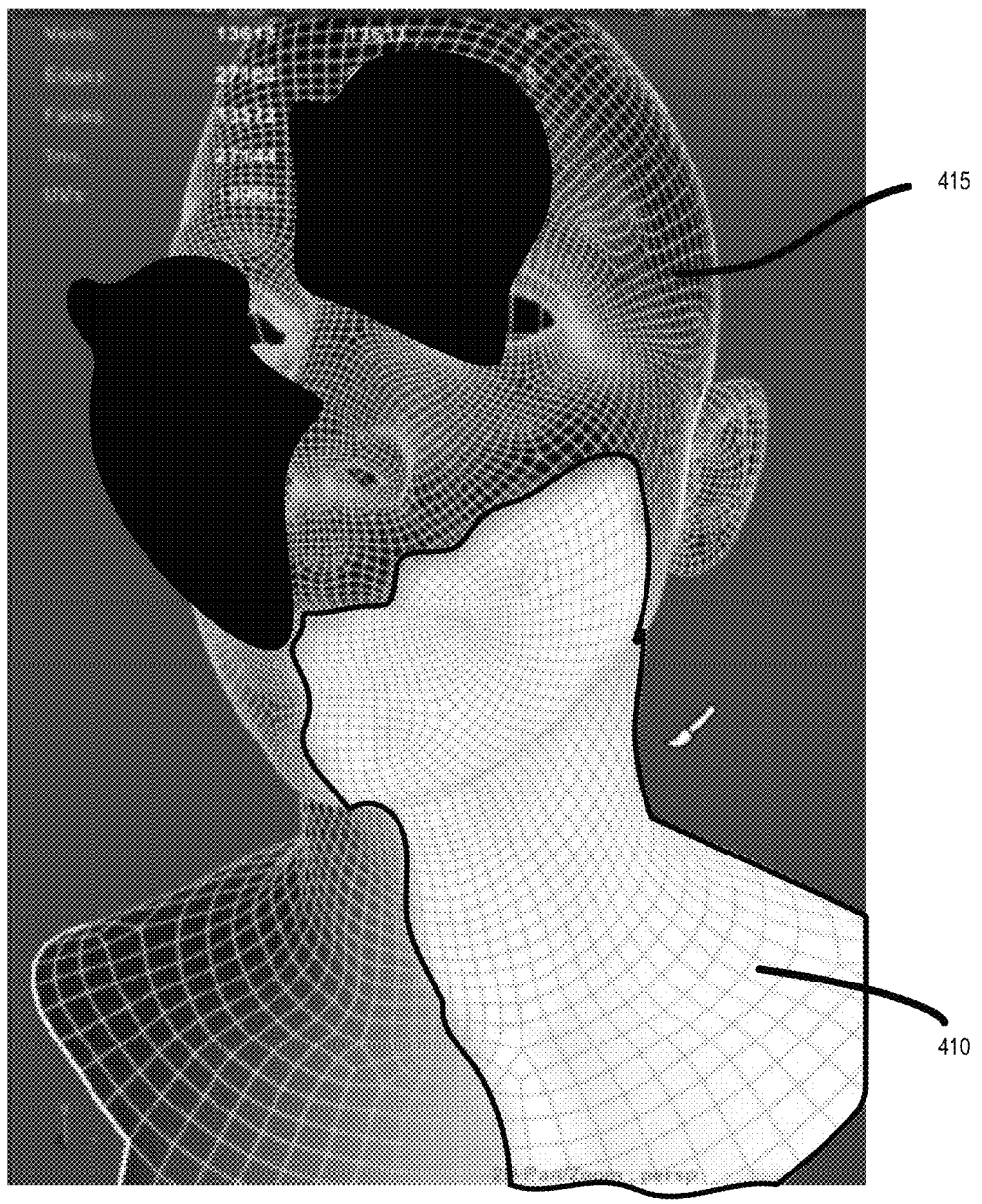
FIG. 4A-1 illustrates the isolation of a portion of a shape of an object through the painting of vertices of a 3D wire frame, in accordance with one embodiment of the disclosure.
Figures 2, 4A:
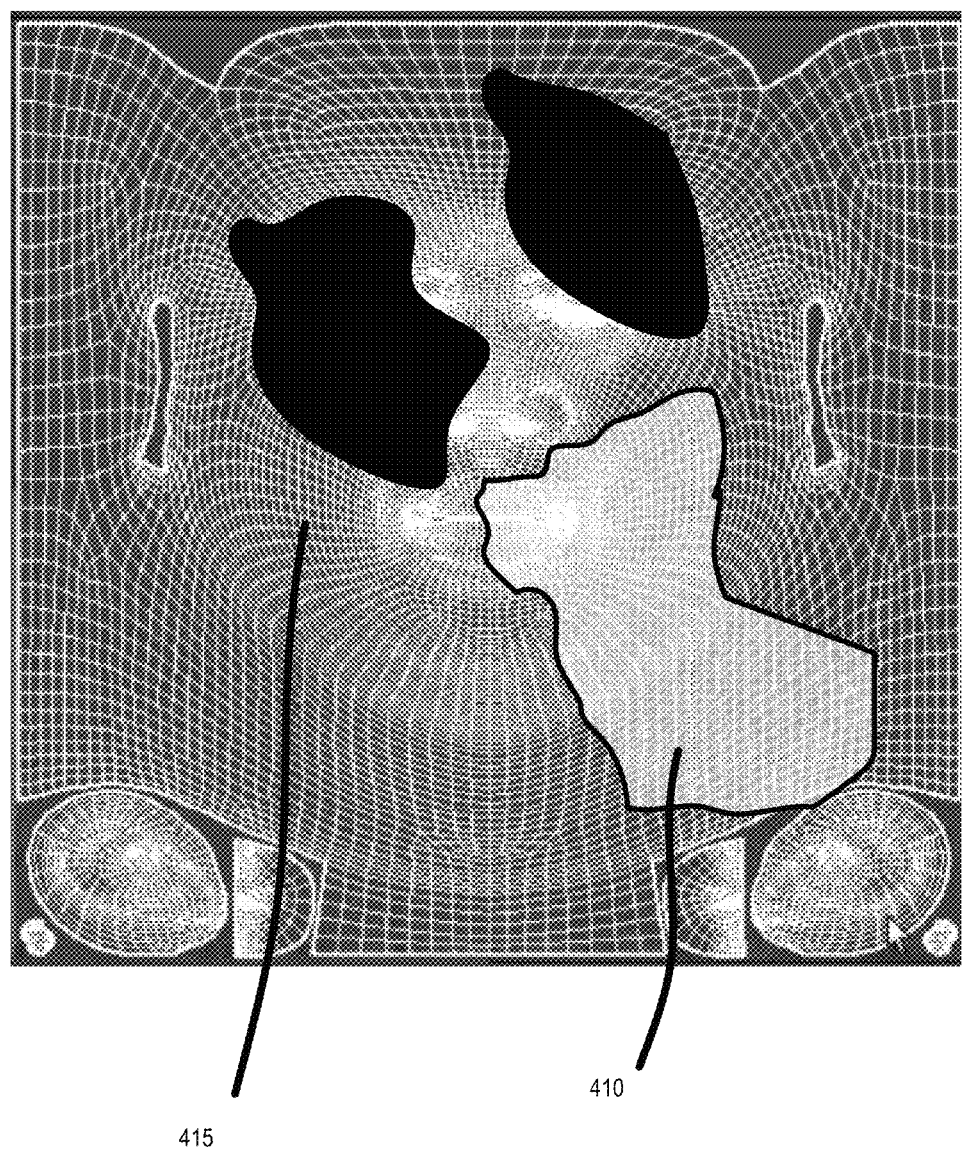

FIG. 4A-1 illustrates the isolation of a portion 410 of a shape 100C of an object through the painting of vertices of a 3D wire frame, in accordance with one embodiment of the disclosure. In particular, the shape 100C is a 3D wire frame of a face (e.g., the object) previously introduced in FIG. 1C. Portion 410 of the shape 100C is configured to identify the lower left side of the shape that is the face. In particular, the portion 410 may be identified by painting vertices of the 3D wire frame that are located within the portion 410. In one embodiment, weights of the vertices are painted in the 3D wire frame. In that manner, a falloff between the isolated portion 410 of the shape and areas outside of the isolated portion 410 may be defined using the plurality of weights of the plurality of vertices of the 3D wire frame, wherein the plurality of weights corresponds to a plurality of shades of the first color or second color. For example, this may be performed using a painting feature of a corresponding editing platform (e.g., editing platform 250). In that manner, all the vertices within the portion 410 of the shape 100C may be painted quickly without individually selecting each and every vertex contained within the portion 410. As previously described, the features defined by portion 410 of the shape 100C may be manipulated and/or edited in isolation from the portion 415 that is outside of portion 410.

FIG. 4A-2 illustrates the isolation of the same portion 410 of the shape 100D of the same object associated with the shape 100C of FIG. 4A-1 through the painting of vertices of a corresponding UV map, in accordance with one embodiment of the disclosure. In particular, the shape 100D is a UV map of the face (e.g., the object), wherein the UV map 100D was previously introduced in FIG. 1D. Portion 410 of the shape 100D is also configured to identify the lower left side of the shape that is the face. That is, the lower left side of the face (as portion 410) may be identified using the corresponding wire frame or the corresponding UV map. In particular, the portion 410 may be identified by painting vertices of the UV map that are located within the portion 410. In one embodiment, weights of the vertices are painted in the UV map. In that manner, a falloff between the isolated portion 410 of the shape and areas outside of the isolated portion 410 may be defined using the plurality of weights of the plurality of vertices of the UV map, wherein the plurality of weights corresponds to a plurality of shades of the first color or second color. For example, this may be performed using a painting feature of a corresponding editing platform (e.g., editing platform 250). In that manner, all the vertices within the portion 410 of the shape 100D may be painted quickly without individually selecting each and every vertex contained within the portion 410. As previously described, the features defined by portion 410 of the shape 100D may be manipulated and/or edited in isolation from the portion 415 that is outside of portion 410.

Figures 1, 4B:
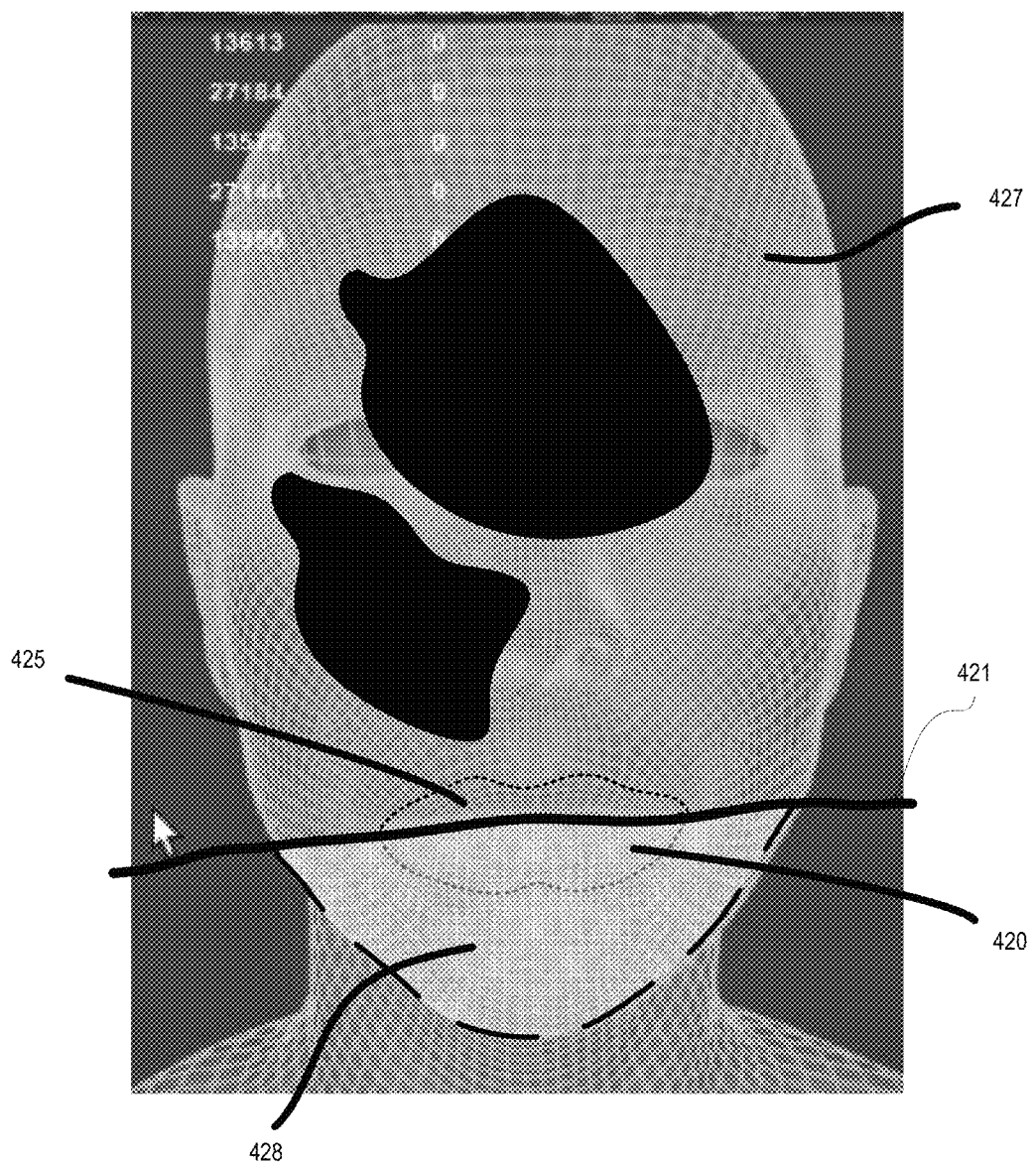
Figures 2, 4B:
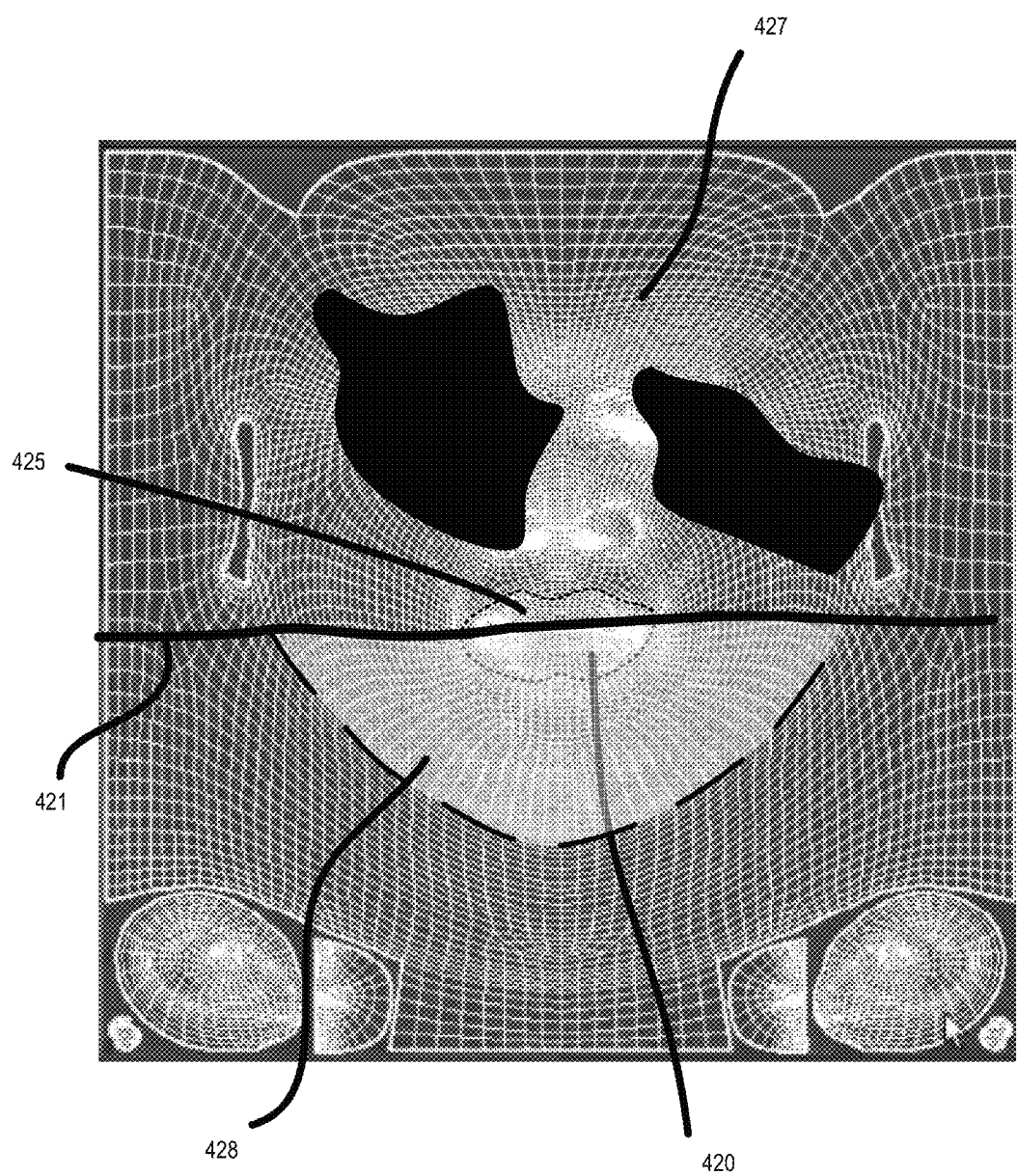

Embodiments of the present disclosure provide for mapping out sections to be split using customized off-center lines. For example, a non-central line (mostly vertical) could be configured to split an object into left and right portions. Also, a non-central line (mostly horizontal) could be configured to that split the object into top and bottom sections. For instance, the non-central and mostly horizontal line could be configured to center on the mouth, or instead on the eyes. In one case, a top portion of the mouth would be included in the top section of the object, and a bottom portion of the mouth would be included in the bottom section of the object. Similarly in the other case, a top portion of the eyes would be included in the top section of the object, and a bottom portion of the eyes would be included in the bottom section of the object. Because embodiments of the present disclosure provide for customized definition of portions of an object, one portion of a feature (e.g., top portion of the mouth) within an object (e.g., a face) may be manipulated in its corresponding section (top section) in isolation from another portion of the feature (e.g., bottom portion of the mouth) of the object. For example, FIGS. 4B-1 and 4B-2 show how the different parts of a mouth (e.g., of a face) may be isolated for purposes of manipulating one part of the mouth in isolation from another part of the mouth, and in isolation from other portions of the face. In that manner, embodiments of the present disclosure provide for increased variation of the movement of the mouth, as individual portions of the mouth (e.g., upper and lower portions of the mouth) may be manipulated in isolation.

In particular, FIG. 4B-1 illustrates the isolation of top and bottom parts of a mouth of a shape 100C of an object (e.g., of a face) through the painting of vertices of a 3D wire frame, in accordance with one embodiment of the disclosure. As previously described, the shape 100C is a 3D wire frame of the face. Portion 425 is configured to identify the upper part of the mouth and is included in the top section 427 of the shape 100C. Portion 420 identifies the lower part of the mouth of the face and is included in the bottom section 428 of shape 100C. Each of the sections 427 and 428 may be identified by painting vertices of the 3D wire frame located within respective portions, wherein line 421 separates the upper section 427 from the lower section 428, wherein line 421 is customized (i.e., straight, non-straight, etc.). For example, this may be performed using a painting feature of a corresponding editing platform (e.g., editing platform 250). In that manner, all the vertices within the portion 425 (i.e., upper part of mouth) and remaining vertices in the upper section 427 may be painted quickly without individually selecting each and every vertex contained within portion 425 or upper section 427 of the wire frame. Also, all the vertices within the portion 420 (i.e., lower part of mouth) and remaining vertices in the lower section 428 may be painted quickly without individually selecting each and every vertex contained within portion 420 or lower section 428 of the wire frame. As such, the upper part of the mouth as defined by portion 425 of the shape 100C via control of the upper section 427 may be manipulated and/or edited in isolation from the lower part of the mouth, and from other portions of the lower section 428. Also, the lower part of the mouth as defined by portion 420 via control of the lower section 428 may be manipulated and/or edited in isolation from the upper part of the mouth, and from other portions of the upper section 427.

FIG. 4B-2 illustrates the isolation of the same top and bottom parts of the mouth introduced in FIG. 4B-1 through the painting of vertices of a corresponding UV map as described above, in accordance with one embodiment of the disclosure. In particular, the shape 100D is a UV map of the face (e.g., the object). Upper portion 425 of the mouth in the upper section 427 is configured to identify the upper part of the mouth, and lower portion 420 of the mouth in the lower section 428 identifies the lower part of the mouth of the face in the UV map. That is, the upper section 427 including the upper part of the mouth 425 the lower section 428 including the lower part of the mouth may be identified using the corresponding wire frame or the corresponding UV map. Each of the sections 427 and 428 may be identified by painting vertices of the UV map located within respective portions. For example, this may be performed using a painting feature of a corresponding editing platform (e.g., editing platform 250). In that manner, all the vertices within the portion 425 (i.e., upper part of mouth) and remaining vertices in the upper section 427 may be painted quickly without individually selecting each and every vertex contained within portion 425 of the UV map. Also, all the vertices within the portion 420 (i.e., lower part of mouth) and remaining vertices in the lower section 428 may be painted quickly without individually selecting each and every vertex contained within portion 420 of the UV map. As such, the upper part of the mouth as defined by portion 425 of the shape 100D via control of the upper section 427 may be manipulated and/or edited in isolation from the lower part of the mouth, and from other portions of the lower section 428. Also, the lower part of the mouth as defined by portion 420 via control of the lower section 428 may be manipulated and/or edited in isolation from the upper part of the mouth, and from other portions of the upper section 427.

Figure 5:
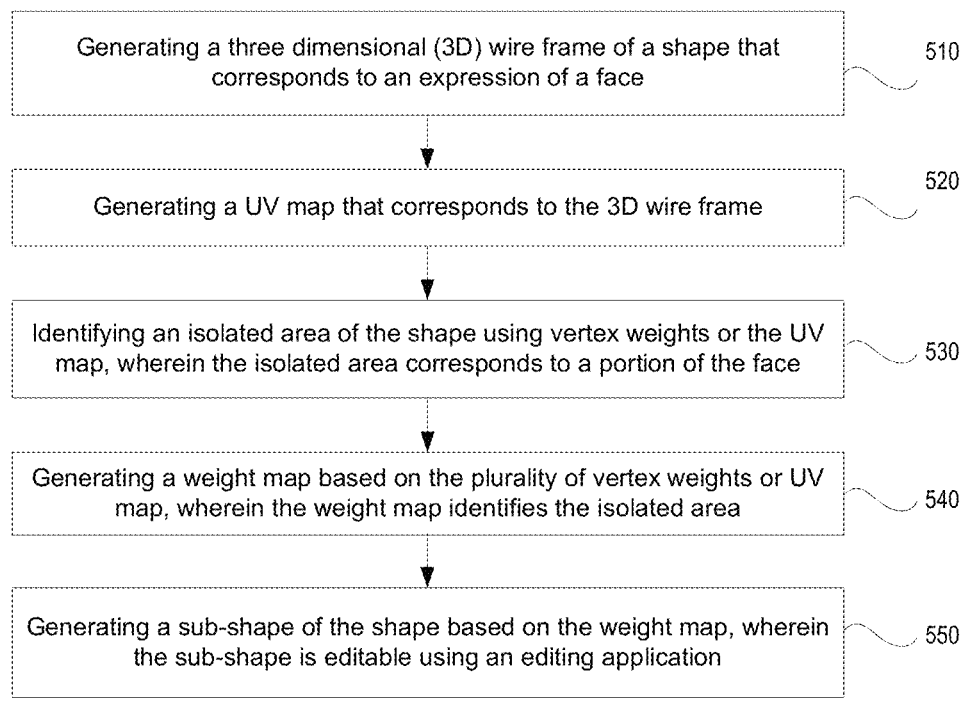
FIG. 5 is a flow diagram illustrating a method for animation including the splitting of a shape of an object into unique off-center and customized sub-shapes that can be used for editing and combining, in accordance with one embodiment of the disclosure.

With the detailed description of system 200, flow diagram 500 of FIG. 5 discloses a method for animation including the splitting of a shape of an object into unique off-center and customized sub-shapes that can be used for editing and combining, in accordance with one embodiment of the disclosure. For example, the operations performed in flow diagram 500 may be implemented by the split-shape generator 210, previously introduced.

At 510, the method includes generating a three dimensional (3D) wire frame of a shape that corresponds to an object. For example, the object may be a face of a character, and the shape may define an expression of the face. In particular, the 3D wire frame may be representation of the 3D object, such as representing the expression of the face. The 3D wire frame may include vertices within a 3D space (e.g., a space defined by "x", "y", and "z" coordinates).

At 520, the method includes generating a UV map that corresponds to the 3D wire frame. As previously described, the UV map may be a projection of the 3D wire frame in two dimensional UV space. That is, there is a one-to-one correspondence of vertices in the 3D wire frame and vertices in the UV map.

At 530, the method includes identifying an isolated area or portion of the shape using vertex weights (i.e., vertex weights of vertices in the 3D wire frame or UV map) or the UV map. For example, the isolated portion may correspond to a portion of the face. As previously described, the identified portion of the shape may be selected through the painting of vertices in a 3D wire frame (e.g., through selection and/or editing of vertex weights) or the corresponding UV map. In addition, weights of the vertices may be painted, such as through painting a plurality of shades of a color, wherein each shade corresponds to a weight. In that manner, a falloff may be defined between the isolated portion and other areas, wherein the falloff defines the transition between the isolated portion and the other areas of the shape.

At 540, the method includes generating a weight map based on the UV map. The weight map identifies the isolated portion of the shape. For example, the isolated or identified portion of the weight map may be identified using a first color (e.g., white). Portions outside of the isolated or identified portion may be identified using a second color (e.g., black). Of course, other colors may be used, and the selection of colors may be reversed (e.g., black identifies the isolated portion). Shading between the first color and the second color indicates the degree of transition between the two portions, such as using the shading to define the falloff between the two portions.

At 550, the method includes generating a sub-shape of the shape based on the weight map. In particular, the information in the weight map may be transferred or translated to a 3D wire frame and/or a corresponding UV map of the shape. In that manner, the sub-shape in wire frame or UV map form may be editable using an editing platform. In particular, the isolated portion of the shape as defined by the corresponding weight map may be manipulated and/or edited in isolation from other portions of the shape using the editing platform.

FIGS. 6A-6H illustrate a base set of weight maps of a shape of an object, wherein each weight map identifies a corresponding portion of a shape of an object that can be manipulated in isolation from other portions of the shape using an editing application or platform, in accordance with embodiments of the present disclosure. In particular, a plurality of weight maps may be generated based on at least one weight map (e.g., defined by a user). That is, each of the plurality of weight maps need not be separately defined. Instead, based on one or more weight maps, a larger number of weight maps may be generated. For example, if a left portion or side of face is defined by a weight map, a weight map defining the right portion of the side of the face may be generated using the weight map defining the left portion. More particularly, the plurality of weight maps identifies a plurality of isolated portions of a corresponding shape. For example, each weight map identifies a separate portion of the shape.

Figure 6B:
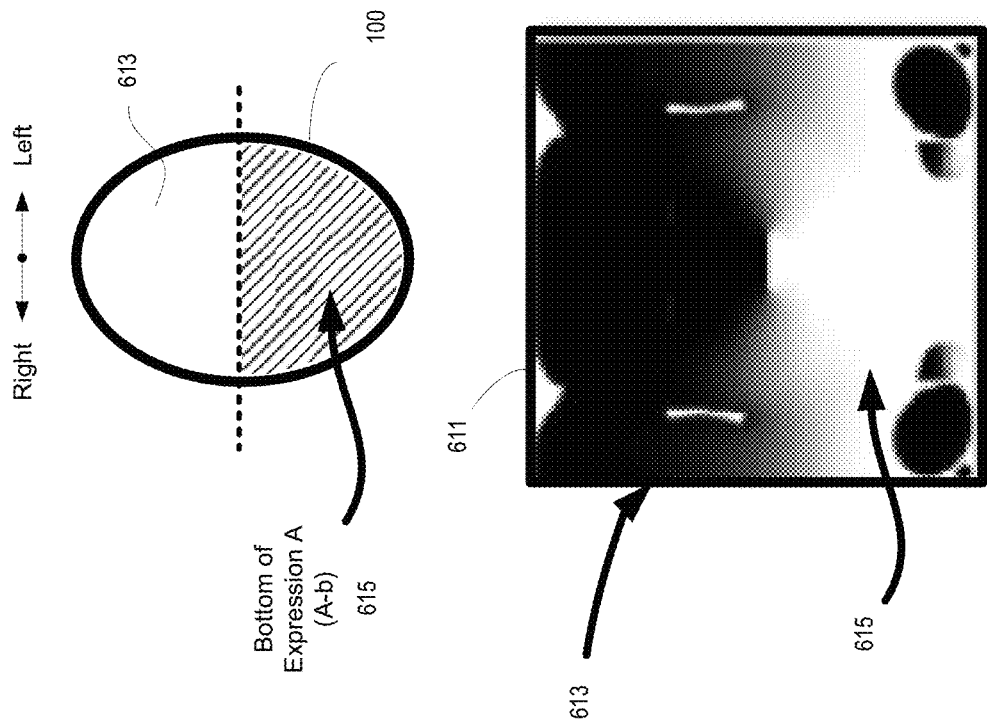
Figure 6A:
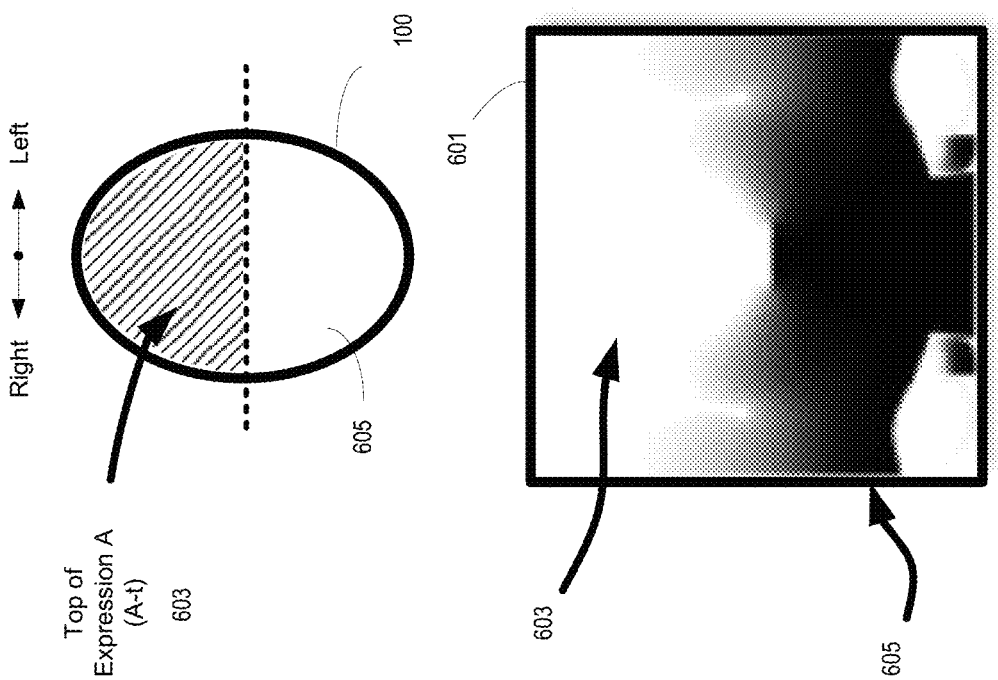

FIG. 6A illustrates a weight map 601 that identifies a top portion of an object 100 that is associated with a shape, such as a face having an expression. For example, the object 100 may be exhibiting an expression "A". The shape of the object may be split into a top portion 603 to generate a sub-shape that enables control of the top portion of the object 100 using an editing application. The corresponding weight map 601 shows the top portion 603 in a first color (e.g., white), and the other portion 605 (e.g., a bottom portion) in a second color (e.g., black). As previously described, the sub-shape (e.g., wire frame and/or UV map) that may be generated based on the weight map 601 may be configured to provide editing of the top portion of the object 100 in isolation from other portions, such as when using an editing application. In addition, a falloff defining a transition between the portions 603 and 605 may be defined using shading of at least one of the first color and second color.

FIG. 6B illustrates a weight map 611 that identifies a bottom portion of the object 100 that is associated with a shape, such as a face having an expression. For example, the object 100 may be exhibiting an expression "A". The shape of the object may be split into a bottom portion 615 to generate a sub-shape that enables control of the bottom portion of the object 100 using an editing application. The corresponding weight map 611 shows the bottom portion 615 in a first color (e.g., white), and the other portion 613 (e.g., a top portion) in a second color (e.g., black). As previously described, the sub-shape (e.g., wire frame and/or UV map) that may be generated based on the weight map 611 may be configured to provide editing of the bottom portion of the object 100 in isolation from other portions, such as when using an editing application. In addition, a falloff defining a transition between the portions 613 and 615 may be defined using shading of at least one of the first color and second color.

Figure 6D:
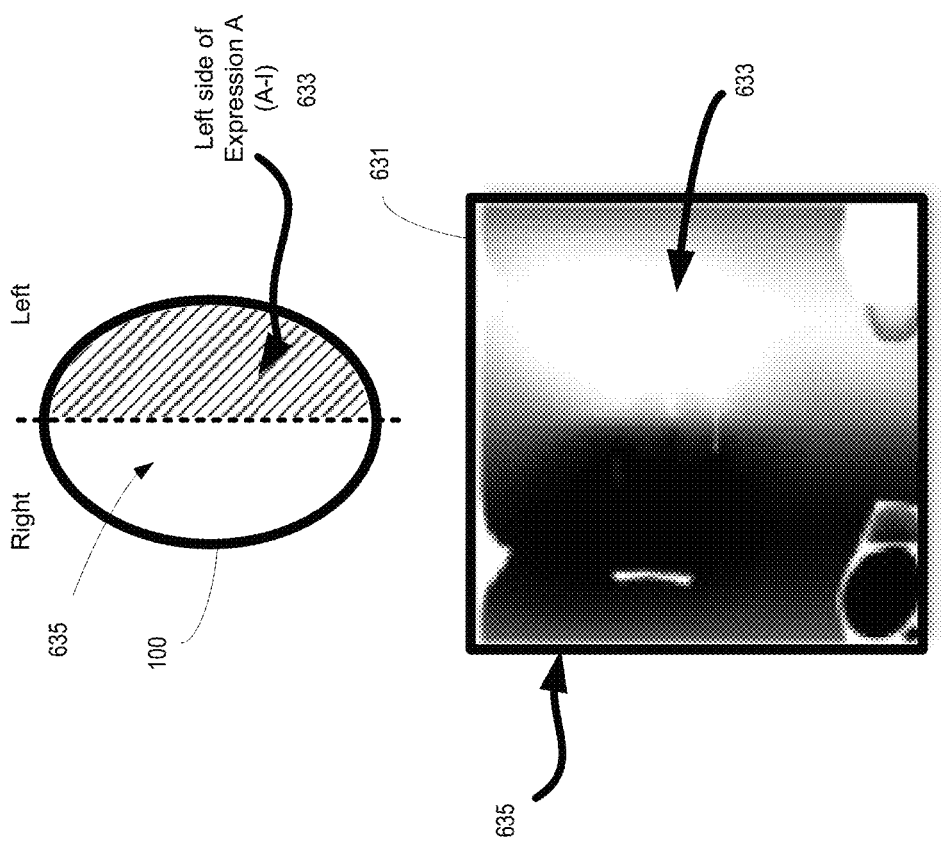
Figure 6C:
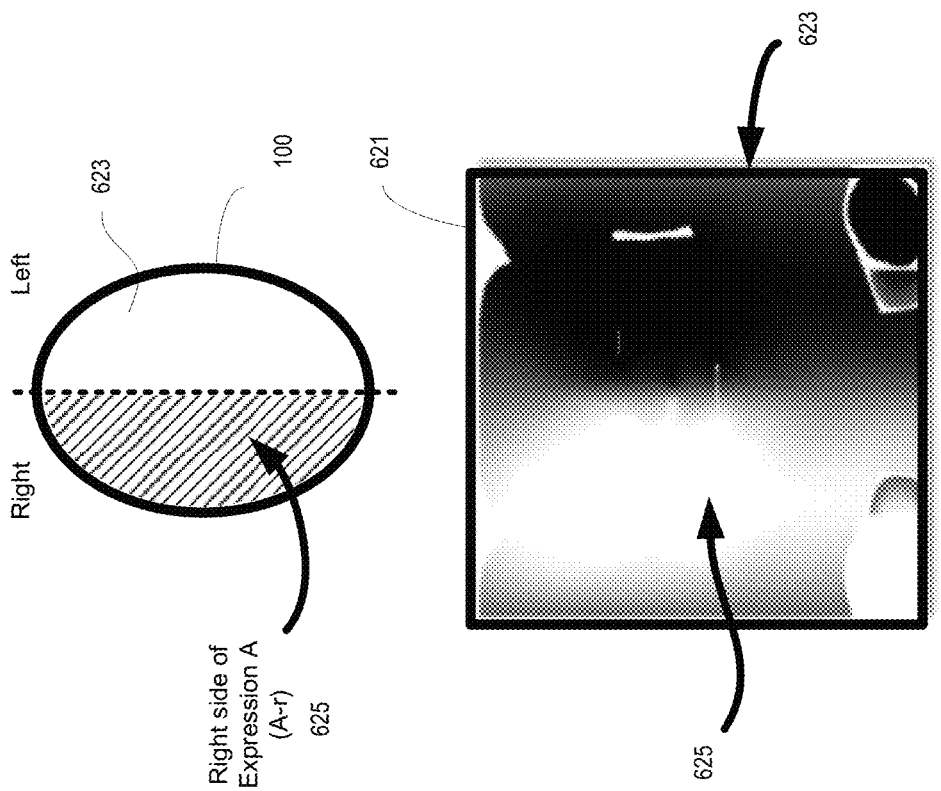

FIG. 6C illustrates a weight map 621 that identifies a right sided portion of the object 100 that is associated with a shape, such as a face having an expression. For example, the object 100 may be exhibiting an expression "A". The shape of the object 100 may be split into a right sided portion 625 to generate a sub-shape that enables control of the right side of the object 100 using an editing application. The corresponding weight map 621 shows the right sided portion 625 in a first color (e.g., white), and the other portion 623 (e.g., a left sided portion) in a second color (e.g., black). As previously described, the sub-shape (e.g., wire frame and/or UV map) that may be generated based on the weight map 621 may be configured to provide editing of the right sided portion of the object 100 in isolation from other portions, such as when using an editing application. In addition, a falloff defining a transition between the portions 625 and 623 may be defined using shading of at least one of the first color and second color.

FIG. 6D illustrates a weight map 631 that identifies a left sided portion of the object 100 that is associated with a shape, such as a face having an expression. For example, the object 100 may be exhibiting an expression "A". The shape of the object 100 may be split into the left sided portion 633 to generate a sub-shape that enables control of the left side of the object 100 using an editing application. The corresponding weight map 631 shows the left sided portion 633 in a first color (e.g., white), and the other portion 635 (e.g., a right sided portion) in a second color (e.g., black). As previously described, the sub-shape (e.g., wire frame and/or UV map) that may be generated based on the weight map 631 may be configured to provide editing of the left sided portion of the object 100 in isolation from other portions, such as when using an editing application. In addition, a falloff defining a transition between the portions 633 and 635 may be defined using shading of at least one of the first color and second color.

In one embodiment, a base set of weight maps may be generated from a plurality of weight maps, wherein the plurality of weight maps includes a first weight map identifying a left or a right portion of an object (e.g., a face), and a second weight map identifying a top or a bottom portion of the object. For purposes of illustration, the object is a face. As such, the base set of weight maps identifies: the left side or portion of the face, the right side or portion of the face, the top portion of the face, the bottom portion of the face, the top left portion of the face, the top right portion of the face, the bottom left portion of the face, and the bottom right portion of the face. For example, FIG. 6E illustrates a weight map 641 identifying a top right quadrant or portion 643 of the face in a first color (e.g., white), and the other portion 645 of the face in a second color (e.g., black). FIG. 6F illustrates a weight map 651 identifying a top left quadrant or portion 653 of the face in a first color (e.g., white), and the other portion 655 of the face in a second color (e.g., black). FIG. 6G illustrates a weight map 661 identifying a bottom right quadrant or portion 663 of the face in a first color (e.g., white), and the other portion 665 of the face in a second color (e.g., black). FIG. 6H illustrates a weight map 671 identifying a bottom left quadrant or portion 673 of the face in a first color (e.g., white), and the other portion 675 of the face in a second color (e.g., black).

In one embodiment, in the plurality of weight maps (e.g., the base set) that is generated from at least one weight map, when one weight map is modified (e.g., the corresponding isolated portion of made larger or smaller, or of a different pattern), the remaining weight maps in the plurality are regenerated based on the weight map that is modified. That is, because the plurality of weight maps can be generated using at least one weight map, when that weight map is modified, the remaining weight maps in the plurality of weight maps can be regenerated using the modified weight map in order to align all the weight maps with the modified weight map.

In one embodiment, a post-split operation may be performed. In particular, once all the sub-shapes are generated corresponding to the plurality of weight maps (e.g., base set of weight maps), the sub-shapes may be combined, such as by using an editing platform. The combined shape may be corrected to align the combined shape with the original unsplit shape. That is, the combined shape should match the original shape (e.g., original expression of the face), especially if none of the sub-shapes have been modified.

In another embodiment, another post-split operation may be performed. In particular, a sub-shape may be modified using an editing platform or application, wherein the sub-shape may be represented by a 3D wire frame or UV map. A combined shape may be generated by combining the modified sub-shape with one or more sub-shapes that correspond to remaining weight maps of the shape. The combined shape is aligned with the original unsplit shape, such that the combined shape including the modified sub-shape looks natural. In particular, a correction is applied to the combined shape to make the transition between the sub shape that is modified and the other sub-shapes in the combination to be in alignment with the transitions between the corresponding portions of the shape in the original unsplit configuration.

Post-Split Contralateral Combinations

Figure 7A:
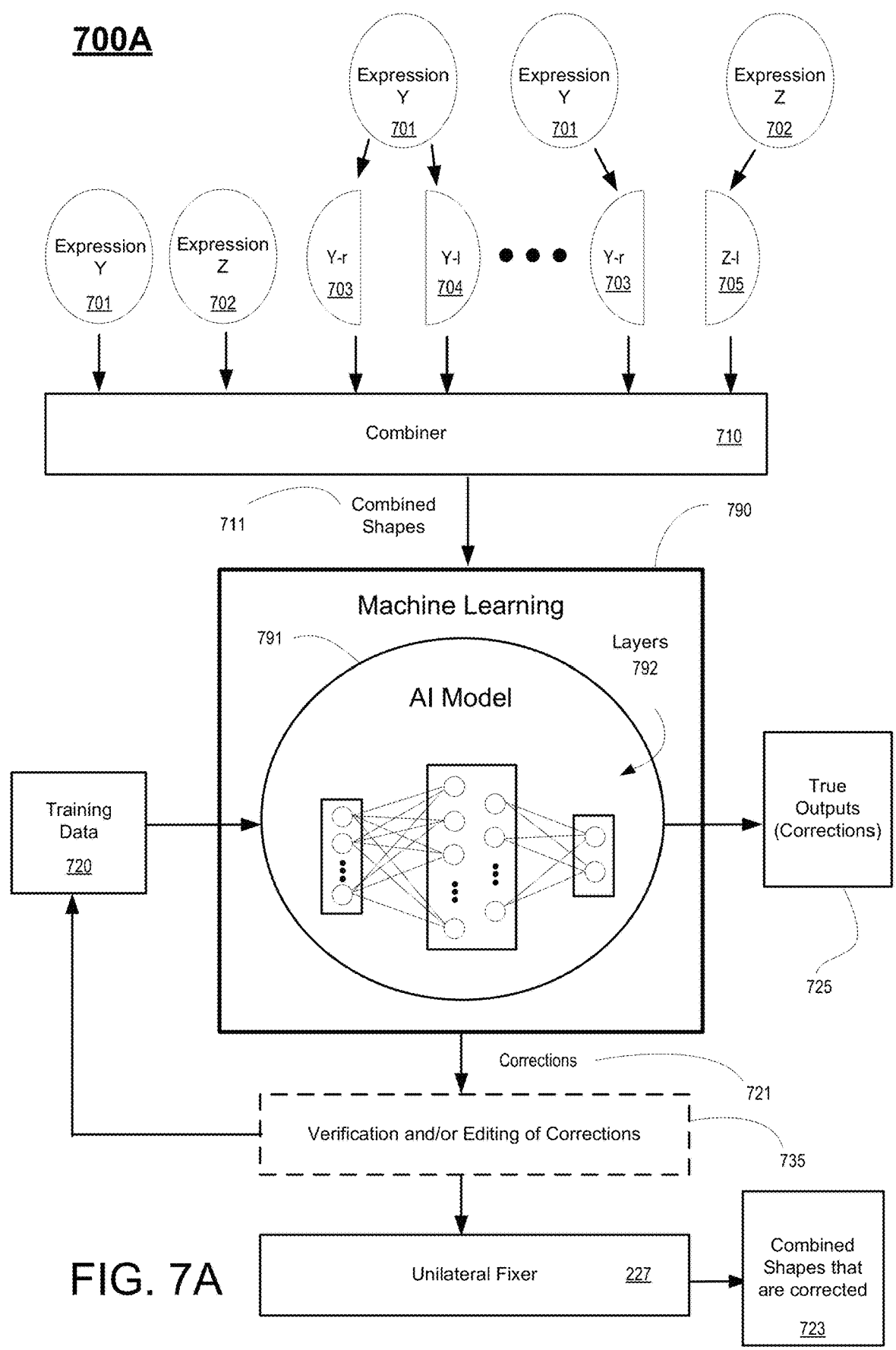
FIG. 7A illustrates a system including a machine learning engine configured for applying corrections to shapes and or sub-shapes of one or more objects that are combined using an editing application and or platform, in accordance with one embodiment of the disclosure.

FIG. 7A illustrates a system 700A including a machine learning engine 790 configured for applying corrections to shapes and or sub-shapes of one or more objects that are combined using an editing application and or platform, in accordance with one embodiment of the disclosure. The system 700A may be implemented within the post-spit engine 220 of FIG. 2. Further, the system 700A works in conjunction with the split-shape generator 210 of FIG. 2 to perform post-split operations, such as applying corrections to combined shapes and sub-shapes.

As previously described, a shape of an object (e.g., an expression of a face) may be split into one or more sub-shapes. For example, shape 701 exhibiting an expression "Y" may be split into one or more sub-shapes, such as a right-sided portion or sub-shape 703 exhibiting expression "Y-r", and a left-sided portion or sub-shape 704 exhibiting expression "Y-l". Also, shape 702 exhibiting an expression "Z" may be split into one or more sub-shapes, such as a right-sided portion or sub-shape (not shown) exhibiting expression "Z-r", and a left-sided portion or sub-shape 705 exhibiting expression "Z-l".

Each of the shapes and/or sub shapes may be combined together by combiner 710, which may be a feature of an editing platform (e.g., platform 250 of FIG. 2). In particular, combiner 710 may perform the operations included within post-split combiner 223 and post-split contralateral combiner 225 of the post-split engine 220. For purposes of illustration only, combiner 710 may be configured to combine shape 701 (expression Y) and shape 702 (expression Z). Also, combiner 710 may perform the operations of post-split combiner 223 to combine sub-shapes of a single shape. For example, combiner 710 may be configured to combine sub-shapes of expression Y, such as combining sub-shape 703 (right side of expression Y) and sub-shape 704 (left side expression Y). Further, combiner 710 may perform the operations post-split contralateral combiner 225 to combine sub-shapes generated from different shapes (e.g., sub-shapes from different expressions) on different sides of a split (e.g. both sides of a face). For example, combiner 710 may be configured to combine sub-shape 703 exhibiting the right side of expression Y (e.g., Y-r), and sub-shape 705 exhibiting the left side of expression Z (e.g., Z-l).

In one embodiment, each of the combined shapes 711 are provided as input to the machine learning engine 790 that is configured in part to help align a particular combined shape with their originating unsplit shapes so that the combined shape looks natural. In particular, the AI model 791 as implemented by machine learning engine 790 is configured to determine the appropriate correction (if any) to apply to a corresponding combined shape for purposes of reunification with respective unsplit states of the originating objects. For example, the AI model 791 (as implemented by the machine learning engine 790) is configured to identify and/or classify the appropriate correction to be applied to a corresponding combined shape. In one embodiment, the AI learning model is a machine learning model configured to apply machine learning to classify corrections applied to combined shapes. In another embodiment, the AI learning model is a deep learning model configured to apply deep learning to classify corrections, wherein machine learning is a sub-class of artificial intelligence, and deep learning is a sub-class of machine learning. As such, artificial intelligence is used to classify the corrections to be applied to combined shapes for purposes of reunification of a combined shape back with its original unsplit shapes.

In particular, a corresponding correction 721 for a corresponding combined shape may be provided as output to the unilateral fixer 227, wherein the fixer 227 is configured to apply the correction to the combined shape. In some embodiments, the unilateral fixer 227 is able to determine the correction to be applied based on the types of shapes or sub-shapes that are being combined (i.e., to a pre-existing unsplit state). As such, the unilateral fixer 227 is configured to apply rules defining the correction. In particular, the optional correction may be applied by the unilateral fixer 227 to a combined shape for purposes of reunification with respective unsplit states of the originating objects, or in other words to bring the combined shape into alignment with the unsplit state of respective original shapes. The unilateral fixer 227 provides as an output the combined shapes that are corrected 723.

As shown in FIG. 7A, the AI model 791 is updateable by providing feedback and/or trusted data to continually train the AI model. For example, corrections 721 that are output by the AI model 791 are received by the verification engine 735, which is configured to verify the truthfulness or quality of the correction. When the verification engine 735 determines that a corresponding correction is of high quality for a given combined shape, that correction and its associated information (e.g., shapes, sub-shapes, features of shapes and sub-shapes, combined shape, etc.) are provided as training data back into the machine learning engine 790 (e.g., as feedback). In some embodiments, the verification engine 735 may recognize modifications to the corrections (e.g., manual adjustments of a user or AI learned adjustments), and provide those modified corrections back to the AI model as training data 720.

Figure 7B:
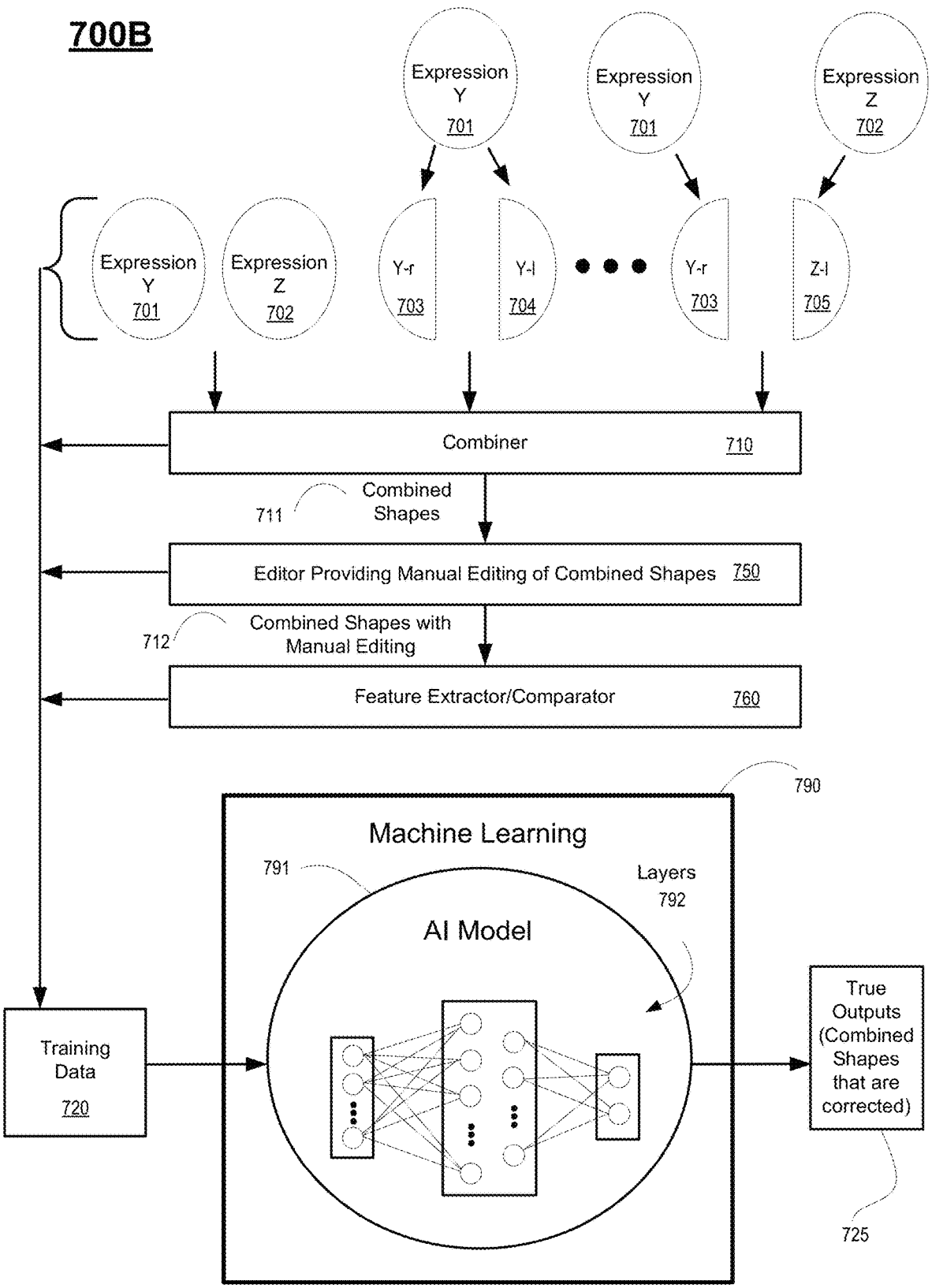
FIG. 7B illustrates a system configured for training the machine learning engine introduced in FIG. 7A to learn corrections that are applied when combining shapes and or sub-shapes of one or more objects using an editing application and or platform, in accordance with one embodiment of the disclosure.

FIG. 7B illustrates a system 700B configured for training the machine learning engine 790 (i.e., the AI model 791 implemented by the engine 790) introduced in FIG. 7A to learn corrections that are applied when combining shapes and or sub-shapes of one or more objects using an editing application and or platform, in accordance with one embodiment of the disclosure. Generally, the AI model 791 is configured to learn and/or classify the corrections to apply to combined shapes. In addition, the AI model 791 is updateable by providing feedback and/or trusted data to continually train the AI model. For example, the AI model 791 can be a machine learning model configured to apply machine learning, or a deep learning model configured to apply deep learning, both configured to determine appropriate corrections to apply to corresponding combined shapes, as previously described. In short, artificial intelligence is used to determine the appropriate corrections to be applied to combined shapes.

During a training phase, information relevant to the process of combining shapes is collected and provided to the machine learning engine 790. For example, as previously described shapes and/or sub-shapes that are provided to the combiner 710 may be provided to the machine learning engine 790, to include purely for illustration shape 701 (exhibiting expression Y), shape 702 (exhibiting expression Z), sub-shape 703 (exhibiting the right side of expression Y), sub-shape 704 (exhibiting the left side of expression Y), and sub-shape 705 (exhibiting the left side of expression Z). In addition, the combined shapes 711 may be provided as training data 720.

In addition, editor 750 is configured to enable manual editing of the combined shapes, such as by a user. For example, editor 750 may be the editing platform 250, previously introduced in FIG. 2. In particular, a skilled artist and/or animator may manipulate the combined shape 711, thereby providing manual corrections to a combined shape, such as to make the combined shape look more natural. For example, the combined shape 711, may not look appropriate to the animator, and as such, the animator may modify the combined shape (e.g., via the corresponding wire mesh or UV map) to make it look more appropriate. This combined shape that includes manual editing 712 may be collected as training data 720.

Also, the feature extractor/comparator 760 may be configured to determine the manual modifications that are applied to the combined shape, and any other relevant data. Feature selection and/or extraction may also be performed to reduce the number of features for relevancy, accuracy, and efficiency when implementing the AI model 791. In particular, wire frames and/or UV maps for both the combined shapes 711 and their corresponding combined shapes that have been modified with manual editing may be compared. In some implementations, feature extraction may be performed by AI model 791 configured to recognize features relevant to generating corrections. Specifically, the change in locations (e.g., delta) of corresponding vertices between the two shapes are compared to quantify any manual editing that is applied to the combined shape 711 to generate the combined shape with manual editing 712. As such, the feature extractor/comparator 760 is configured to determine the delta of corresponding vertices between the combined shape 711 (having corrections) and the combined shape modified with manual editing 712. The delta information may be collected as training data 720.

As shown, the training data 720 is provided as input to the machine learning engine 790 in order to train the AI model 791 to classify and/or determine the appropriate corrections to apply for various combined shapes. The machine learning engine 790 may be configured for training or implementation. Specifically, during the training phase, the AI model 791 is trained using a training AI algorithm (e.g., machine learning or deep learning training algorithm) that is configured to classify and/or learn corrections that are applied in association with corresponding combined shapes 711 using training data 720. These corrections are provided as true outputs 725 from the AI model 791. During the implementation phase, the AI model 791 is configured to determine the appropriate correction to apply to a combined shape 711, wherein application of the correction may be performed by the unilateral fixer 227, previously described.

More particularly, during the training phase, training data 720 may be provided as input to the machine learning engine 790, which implements a training algorithm to fit the structure of the AI model 791 to the training data by tweaking the parameters of the AI model, so that the trained AI model provides an accurate relationship between input (training and/or telemetry data) and output (classified data). Training and/or learning may be supervised using known and true outputs 425 (e.g., known instances of desirable and undesirable behavior) associated with the training data 720, such as to learn the appropriate corrections. Training and/or learning may be unsupervised, wherein no known or true outputs are provided for the training data 720, such that given input data the AI model learns to identify the corrections appropriate to apply to combined shapes. Training may implement both supervised and unsupervised training. For example, after performing unsupervised training, supervised learning may be performed with known data. Training and implementation of the AI model 791 is further described below for purposes of illustration only.

The machine learning engine 790 may be configured as a neural network used to train the AI model 791 through learning, in accordance with one embodiment of the disclosure. In one embodiment, machine learning engine 791 may be implemented to classify corrections that are applied to combined shapes. Specifically, machine learning engine 790 is configured to analyze training data 720 during the training phase to build (e.g., train through learning) the AI model 791. As such, the training data 720 is fed to the machine learning engine 790, which utilizes artificial intelligence, including supervised learning algorithms, unsupervised learning algorithms, reinforcement learning, or other artificial intelligence-based algorithms to build the AI model 791.

The neural network in the machine learning engine 790 represents an example of an automated analysis tool for analyzing data sets to classify corrections to be applied to combined shapes. Different types of neural networks are possible for applying artificial intelligence. Though a machine learning engine applying machine learning is shown, it is understood that other AI techniques may be utilized, such as deep learning applied by a deep learning engine, in other embodiments. For example, the neural network supports machine learning that may be implemented by the machine learning engine 790. In another example, the neural network supports a deep learning network that may be implemented by deep learning engine, such as one set up as a Markov decision process (MDP) that supports a reinforcement learning algorithm. Accordingly, a deep neural network, a convolutional deep neural network, and/or a recurrent neural network using supervised or unsupervised training can be implemented.

Generally, the neural network in the machine learning engine 790 represents a network of interconnected nodes, such as an artificial neural network, and is used to train the AI model 791. Each node learns some information from data. Knowledge can be exchanged between the nodes through the interconnections. Input to the layers of neural network 792 activates a set of nodes. In turn, this set of nodes activates other nodes, thereby propagating knowledge about the input. This activation process is repeated across other nodes until an output is provided.

As illustrated, the neural network implementing the AI model 791 includes a hierarchy of nodes. For example, within the layers 792 of the neural network there are input nodes receiving input information. Also, within the layers 792 are a set of output nodes, wherein an output node represents a decision (e.g., prediction) that relates to one or more components of an AI model 791, for example. As previously described, the output nodes may classify corrections to be applied to combined shapes. Results from the output nodes can be compared to predetermined and true results (e.g., corrections for combined shapes) obtained from previous corrections that are applied to combined shapes and manual editing of those combined shapes in order to refine and/or modify the parameters used by the machine learning engine 790 to iteratively determine the appropriate classification of corrections.

More particularly, hidden nodes may be provided within the layers of nodes 792, wherein the hidden nodes exist between the input nodes and output nodes. The hidden nodes may be interconnected to other hidden nodes forming layers of hidden nodes. Likewise, the hidden nodes are interconnected to the output nodes, such that the input nodes are not directly interconnected to the output nodes. As such, the input nodes are interconnected to corresponding hidden nodes, which may be interconnected to other hidden nodes (e.g., of another layer), and so on and so forth, until one or more hidden nodes are connected to one or more output nodes. An interconnection connects two nodes. The interconnection has a numerical weight that can be learned, rendering the neural network in the machine learning engine 790 (configured to build the AI model 195) adaptive to inputs and capable of learning.

Generally, the hidden nodes allow knowledge about the input nodes to be shared among all the tasks corresponding to the output nodes. To do so, a transformation $f$ is applied to the input nodes through the hidden nodes, in one implementation. In an example, the transformation $f$ is non-linear. Different non-linear transformations $f$ are available including, for instance, a linear rectifier function $f(x)=\max(0,x)$.

The neural network in the machine learning engine 790 configured to build the AI model 791 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network within the machine learning engine 790 can use back-propagation algorithms to employ different optimization methods to learn model parameters (e.g., the weights for the interconnections between nodes) that minimize the cost function. An example of such an optimization method is stochastic gradient descent.

In an example, the training dataset for the neural network in the machine learning engine 790 (configured to build the AI model 791) can be from a same data domain. For instance, the neural network is trained for learning the corrections to be applied to combined shapes for a given set of inputs or input data. For example, the data domain includes manual editing and/or corrections applied to combined shapes considered as baseline input data. In another example, the training dataset is from different data domains to include input data other than baseline.

As such, the neural network in the machine learning engine 790 configured to build the AI model 791 may identify and/or classify corrections to be applied to any number of combined shapes. Based on these predictive results, the neural network may also define an AI model 791 that is used to classify corrections based on input data related to combined shapes during an implementation phase. That is, the AI model 791 is used to predict and/or classify corrections that are applied to combined shapes for input data that is not training data based on the configuration of the AI model 791.

Figure 7C:
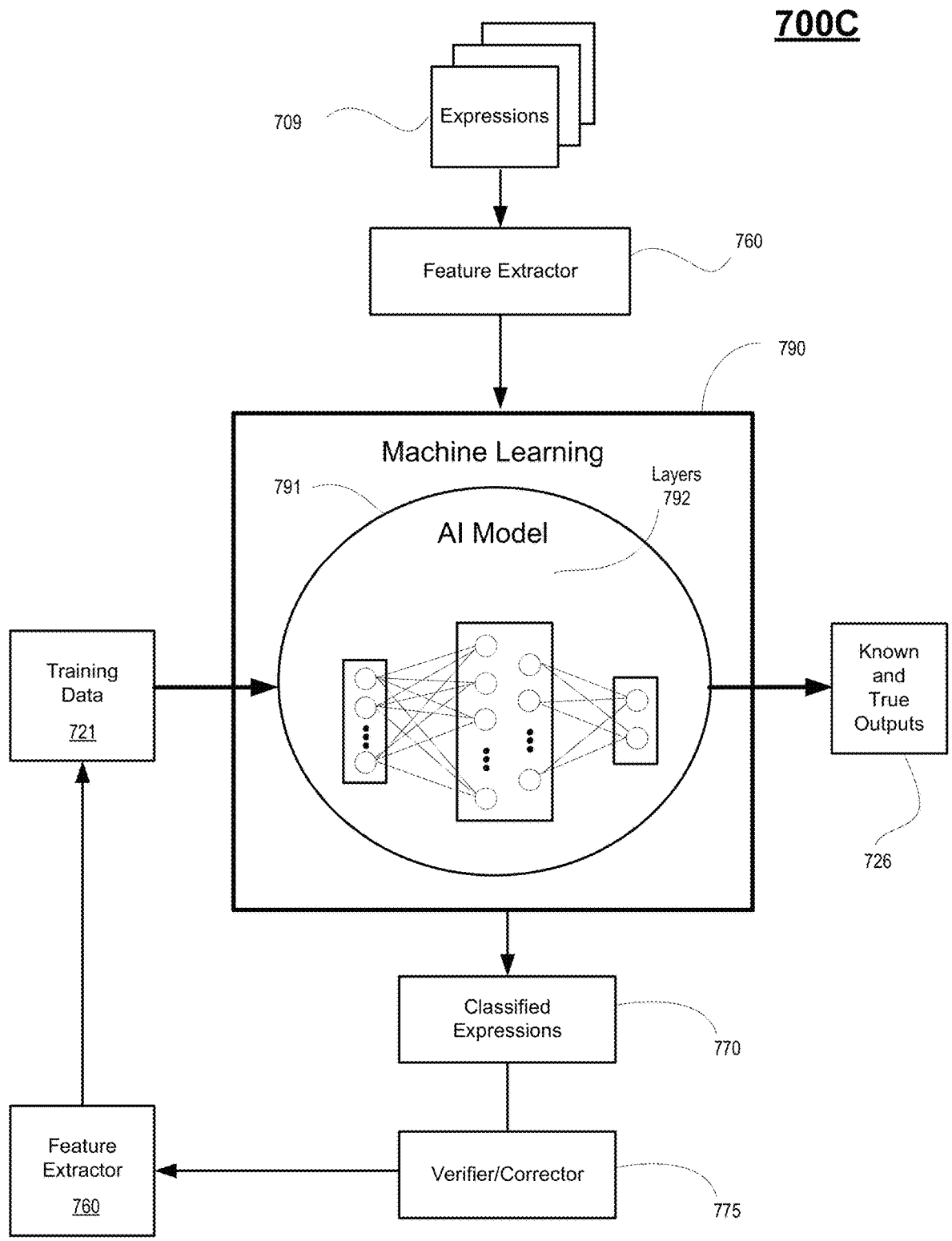
FIG. 7C illustrates a system configured for training a machine learning engine to classify expressions of a face of an object, in accordance with one embodiment of the disclosure.

FIG. 7C illustrates a system configured for training a machine learning engine to classify expressions of a face of an object, in accordance with one embodiment of the disclosure. As shown, the machine learning engine 790 is configured to train the AI model 791 to recognize expressions of a face (e.g., of a character). In particular, a plurality of expressions of faces 709 (e.g., provided in shapes of wire frames and/or UV maps) is provided to a feature extractor 760, which is configured to extract distinguishing features of those expressions. Those features are then provided as training data 721 to the machine learning engine 790, previously introduced. In particular, during the training phase, the AI model 791 is trained using a training AI algorithm (e.g., machine learning or deep learning training algorithm) that is configured to classify and/or learn expressions of a face using the features provided as input data. Training and/or learning may be supervised using known and true outputs 726 (e.g., known expressions). Training and/or learning may be unsupervised, wherein no known or true outputs are provided for the training data, such that given input data the AI model learns to identify the expressions. The AI model 791 is updateable by providing feedback and/or trusted data to continually train the AI model. For example, classified expressions 770 that are output by the AI model 791 are received by the verification engine 775, which is configured to verify the truthfulness or quality of the classification of a corresponding expression. When the verification engine 775 determines that a corresponding classification of an expression is proper, features of that classified expression as determined through the feature extractor 760 are provided as training data back into the machine learning engine 790 (e.g., as feedback using known and/or true data). In some embodiments, the expressions are defined using the standardized facial action coding system (FACS), which provide numerical representations (e.g., as action units—AUs) of various facial expressions. For example, AU-0 defines a neutral expression of a face, AU-12 defines a Lip corner puller expression of a face, and AU-18 defines lip pucker expression of a face, etc.

Figure 8:
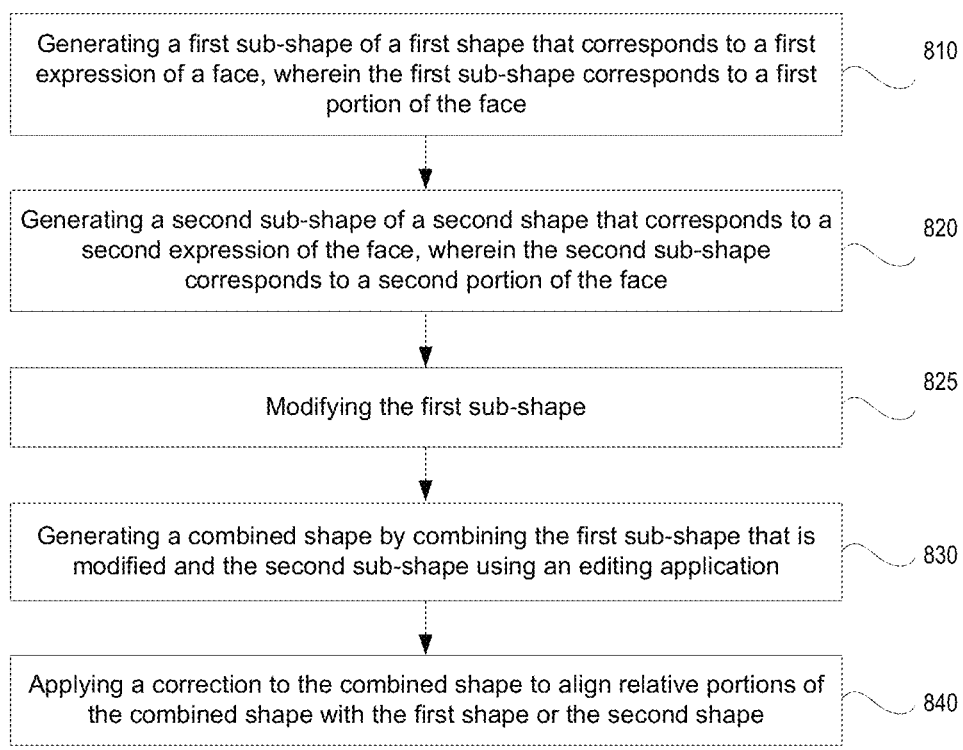
FIG. 8 is a flow diagram illustrating a method for animation including the performing of post-split corrections to shapes and sub-shapes of different expressions that are combined, in accordance with one embodiment of the disclosure.

With the detailed description of system 200, and systems 700A, 700B, and 700C, flow diagram 800 of FIG. 8 discloses a method for animation including the performing of post-split corrections to shapes and sub-shapes of different expressions that are combined, in accordance with one embodiment of the disclosure. For example, the operations performed in flow diagram 500 may be implemented by the post-split engine 220, previously introduced.

As previously introduced, an object (e.g., a face) may be represented by a shape including a 3D wire frame or a UV map. That is, the shape may illustrate an expression of the face. In particular, the 3D wire frame may be representation of the face, and includes vertices within a 3D space (e.g., a space defined by "x", "y", and "z" coordinates). The shape may also be represented by a UV map that includes vertices within a 2D space (e.g., defined by U and V coordinates), wherein the UV map is a projection of the 3D space for the wire mesh onto a 2D space. Vertices between the 3D wire frame and the UV map of a common shape correspond to each other in a one-to-one relationship.

In particular, at 810, the method includes generating a first sub-shape of a first shape, wherein the first shape corresponds to a first expression of a face. The first sub-shape corresponds to a first portion of the face, such as a first or left side of the face for purposes of illustration only. As previously described, the first sub-shape may be generated using a corresponding weight map of the original shape of the face, and may be represented with a corresponding 3D wire mesh and/or UV map.

At 820, the method includes generating a second sub-shape of a second shape, wherein the second shape corresponds to a second expression of the face. The second sub-shape corresponds to a second portion of the face, such as a second or right side of the face for purposes of illustration only. As previously described, the second sub-shape may be generated using a corresponding weight map of the original shape of the face, and may be represented with a corresponding 3D wire mesh and/or UV map.

In some embodiments, the first and second sub-shapes may be separated across the face by a line that is off-center from a vertical line drawn down the center of the face. That is, the first and second sub-shapes need not be similarly sized.

At 825, the method includes modifying the first sub-shape. In other embodiments, the second sub-shape is modified. In still other embodiments, the first and second sub-shapes are modified.

At 830, the method includes generating a combined shape by combining the first sub-shape and the second sub-shape using an editing platform. For illustration, different expressions on opposite sides of a face may be combined. In some implementations, modifications may be made to the first sub-shape and/or the second sub-shape before performing any combining. For example, a sub-shape identifies a portion of a shape that can be manipulated in isolation from other portions of that shape. In that manner, one or more sub-shapes that are combined may also be modified (e.g., using the editing platform) before and/or while performing the combining of the sub-shapes.

At 840, the method includes applying a correction to the combined shape (including any modifications to the sub-shapes, such as modifications to the first sub-shape) to align relative portions of the combined shape with the first shape or the second shape. As previously described, the correction is applied to reunify the combined shape with relative portions of the original unsplit shapes (e.g., original expressions). That is, the combined shape is corrected so that it looks more natural, such that the transition between the two sub-shapes may be consistent or better aligned with the each of the original expressions.

In one embodiment, a final version of the combined shape is generated by editing the correction that is applied to the combined shape. That is, an additional correction is generated, such as by a user providing manual corrections. The additional correction may be provided as training data to a machine learning engine to refine and further train the AI model configured to identify and/or classify corrections for combined shapes. In particular, the AI model is trained using the correction that is further edited (e.g., modified), to generate an update to the correction for the corresponding combined shape.

Figure 9A:
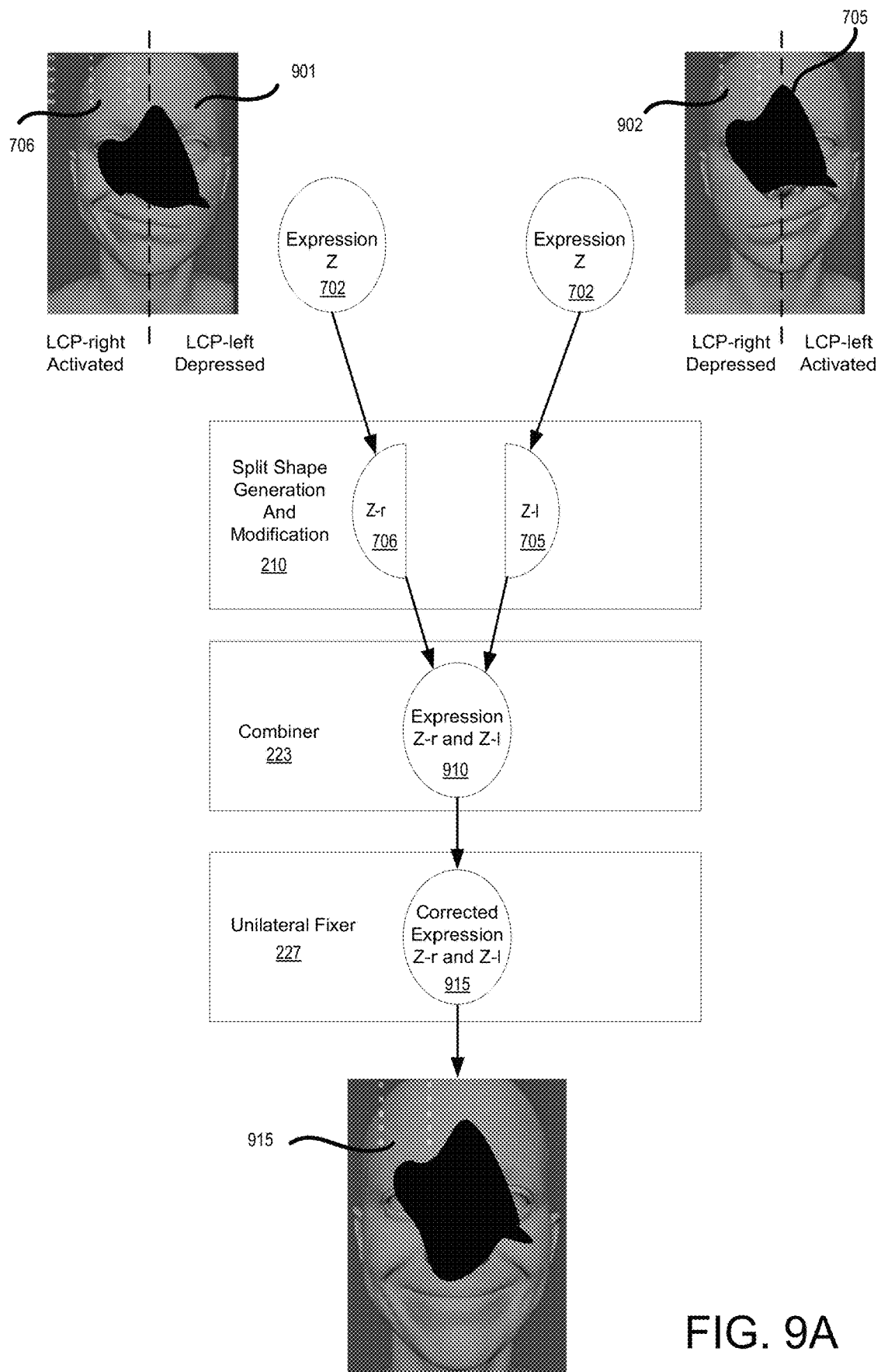
FIG. 9A illustrates an example of splitting a shape of a face having an expression into multiple sub-shapes, and the application of corrections when modifying and combining the sub-shapes, wherein the corrections may be identified using an artificial intelligence model configured to identify and/or determine the corrections when combining shapes and or sub-shapes, in accordance with one embodiment of the disclosure.
Figure 9B:
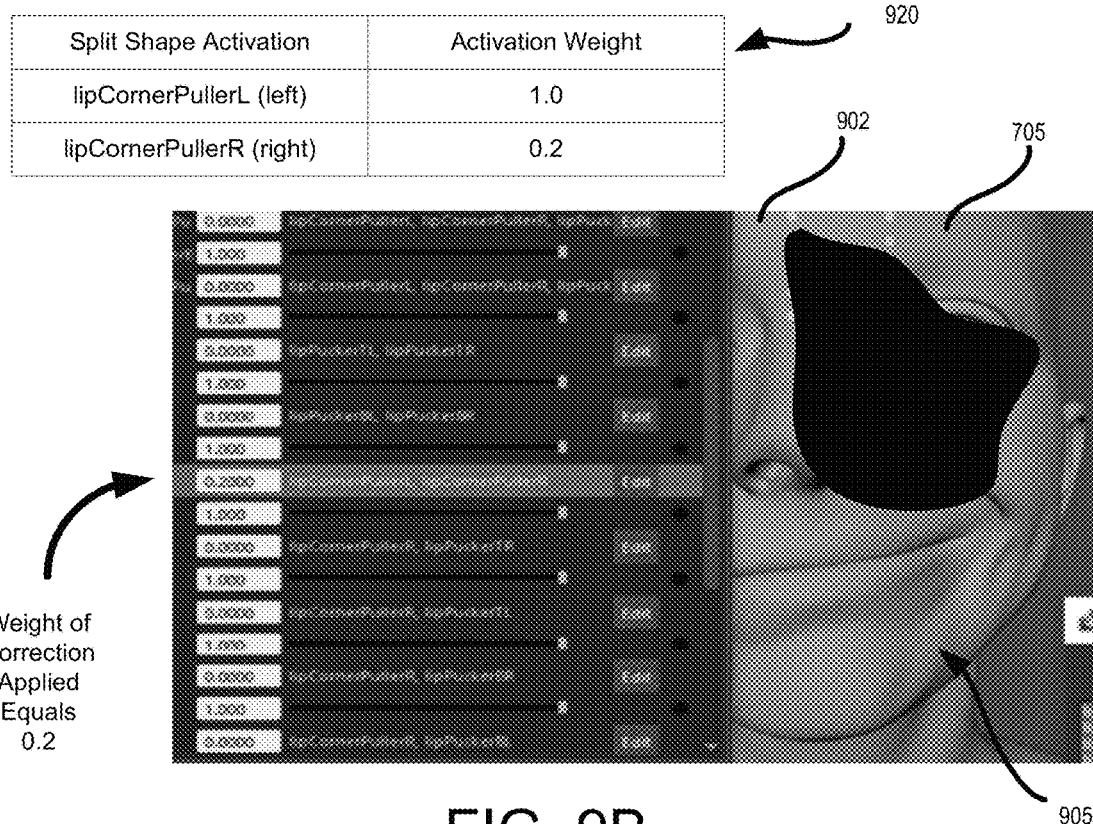
FIGS. 9B-C illustrates the splitting of a shape into left and right sub-shapes, the activations of the sub-shapes with varying weights, and the application of a corresponding weighted correction when the sub-shapes are combined, wherein the weighted correction may be identified using an artificial intelligence model configured to identify and/or determine corrections when combining shapes and or sub-shapes, in accordance with embodiments of the present disclosure.
Figure 9C:
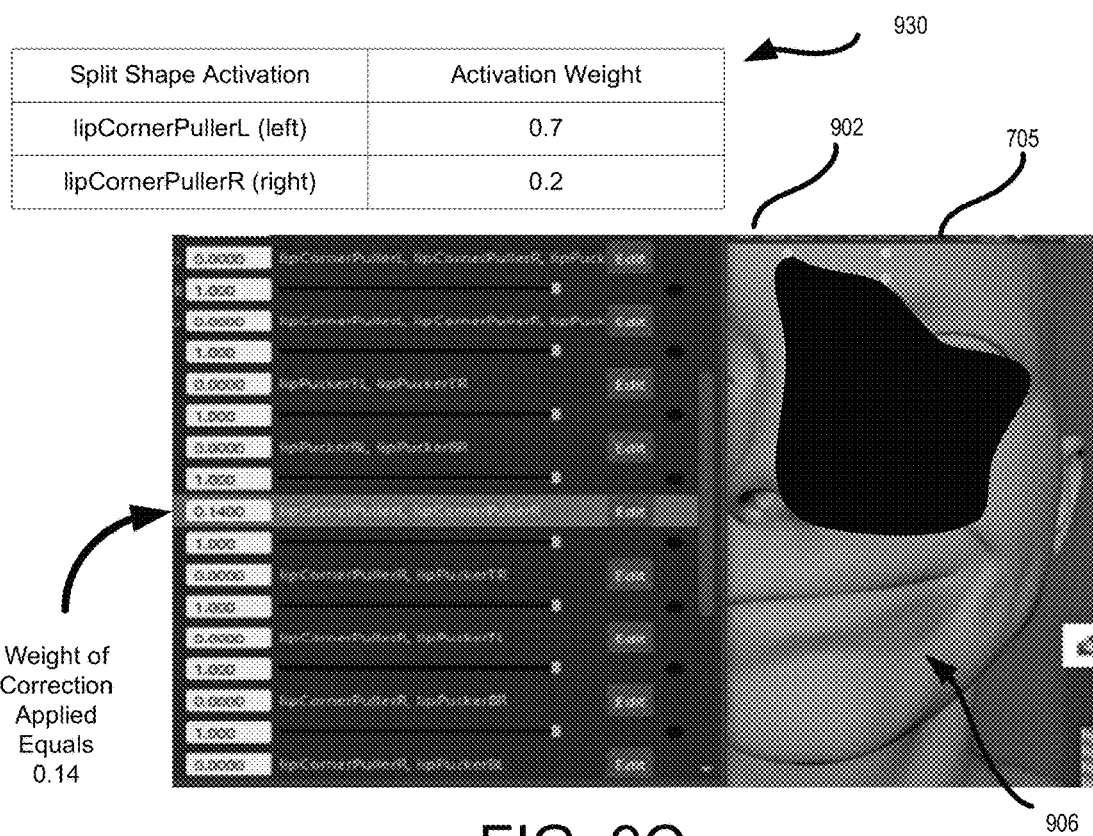
Figure 10:
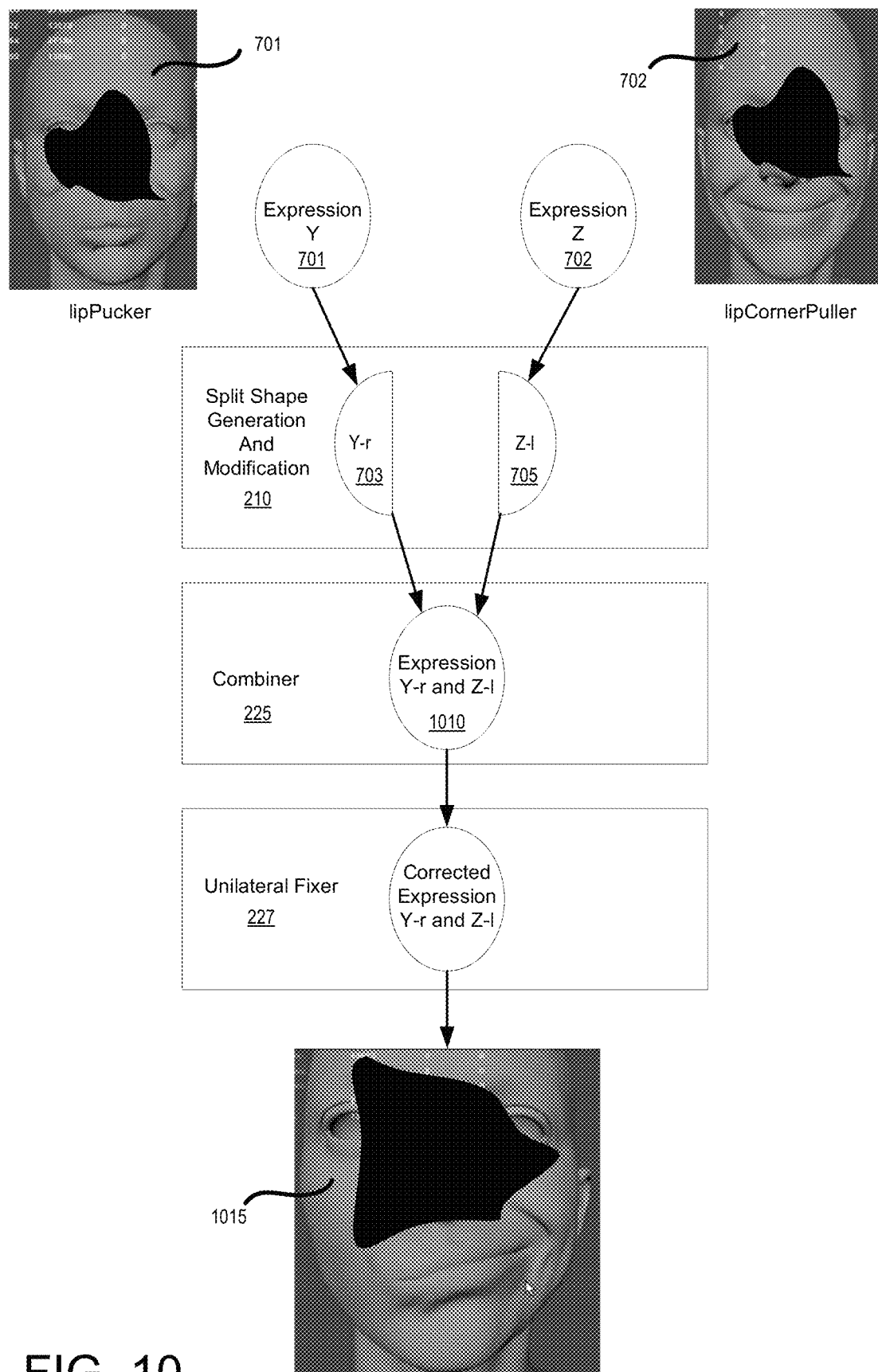
FIG. 10 illustrates the splitting of different shapes with different expressions into sub-shapes, and the application of a correction when combining sub-shapes having different expressions, wherein the correction may be identified using an artificial intelligence model configured to identify corrections when combining shapes and or sub-shapes, in accordance with one embodiment of the disclosure.
Figure 11:
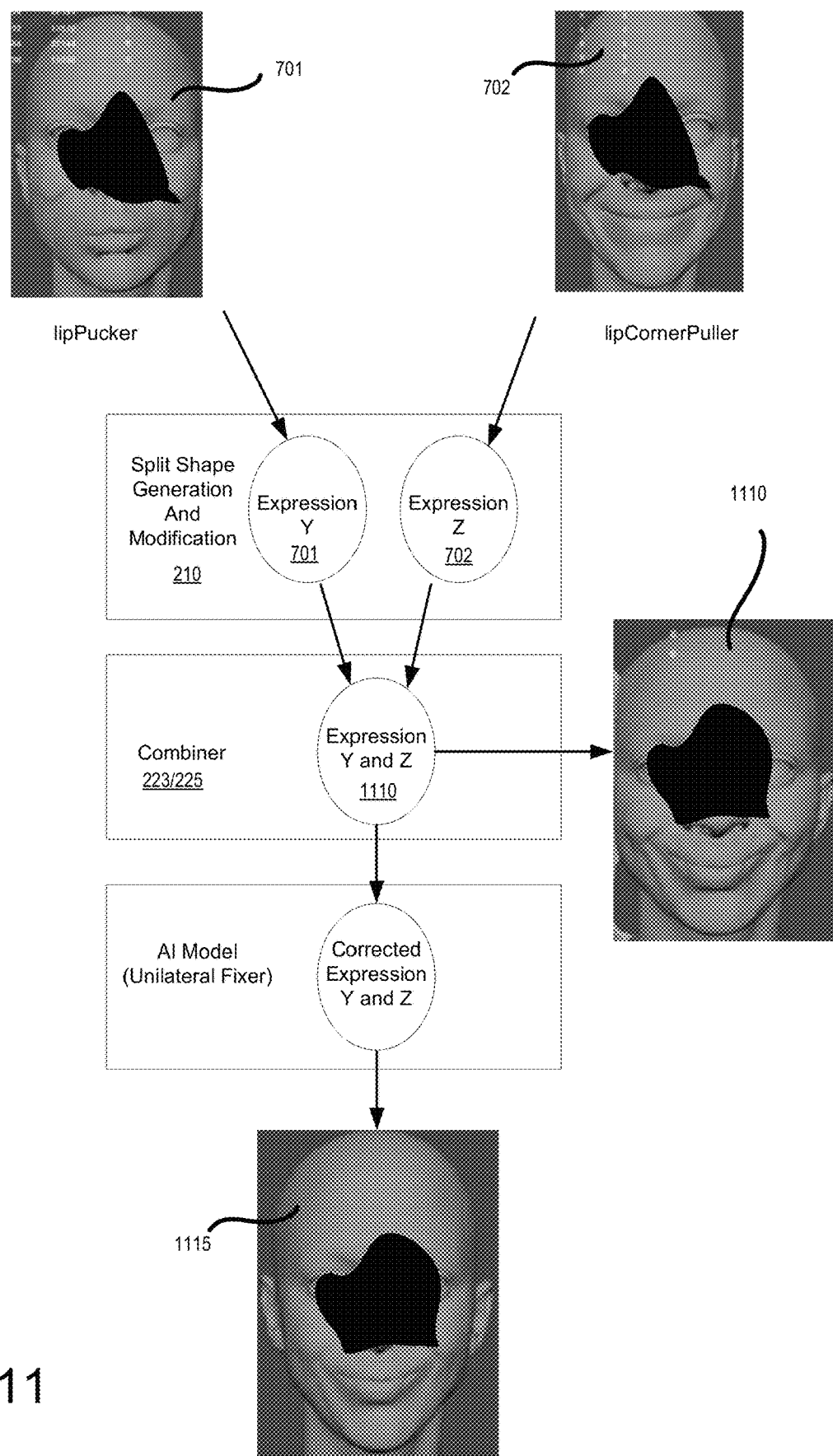
FIG. 11 illustrates the combining of different shapes having different facial expressions, and the application of a correction to the combined shape, wherein the correction may be identified using an artificial intelligence model configured to identify corrections when combining shapes and or sub-shapes, in accordance with one embodiment of the disclosure.

The following illustrations in FIGS. 9-11 may illustrate sub-shapes split along a vertical line that is centralized to an object, for purposes of illustration only. As previously described, a sub-shape may be identified using a customized separator (e.g., through painting of vertex weights of a wire frame or corresponding UV map), and is not limited to central and vertical lines separating and/or identifying different portions of a shape.

FIG. 9A illustrates an example of splitting a shape of a face having an expression into multiple sub-shapes, and the application of corrections when modifying and combining the sub-shapes, in accordance with one embodiment of the disclosure. In one embodiment, the corrections may be applied using an artificial intelligence model configured to identify and apply the corrections when combining shapes and or sub-shapes, in accordance with one embodiment of the disclosure. For example, the application of corrections may be performed by the post-split combiner 223 of the post-split engine 220 of FIG. 2, in one embodiment.

As shown, shape 702 exhibits expression "Z", which may be defined as a Lip Corner Puller (AU 12) expression, or more generally a smile. The shape 702 may be split into two sub-shapes, including sub-shape 705 exhibiting the left side or portion of the shape 702. In that manner, sub-shape 705 allows for isolated control of the left side of the smile. In addition, shape 702 may be split into sub-shape 706 exhibiting the right side or portion of the shape 702. As such, sub shape 706 allows for isolated control of the right side of the smile. Generation of the sub-shapes 705 and 706 may be performed by split-shape generator 210, previously introduced in FIG. 2. Further, modifications to the split-shapes 705 and/or 706 may be performed using an editing platform, as previously described.

The post-split combiner 223 is configured to combine two or more sub-shapes, wherein the sub-shapes are generated from the same shape. In particular, post splitting shape 702 into multiple sub-shapes 705 and 706, the post-split combiner 223 is configured to combine shapes, sub-shapes, or a combination thereof to generate the combined shape. For example, portions of an expression on a face may be manipulated and/or combined using the post-split combiner. As shown, the post-split combiner 223 combines sub-shape 705 and sub-shape 706 into a combined shape 910 (including half expressions Z-r and Z-l). For example, a plurality of sub-shapes may be generated for a shape (e.g., using weight maps), and a combined shape may be generated by recombining the plurality of sub-shapes. The combined shape may be further aligned with the unsplit state of the original shape, as described below. In one embodiment, one or more of the sub-shapes 705 and/or 706 may be further modified using the editing platform before or during combining.

The combined shape is further manipulated by the post-split unilateral fixer 227 that is configured to apply a correction to the combined shape 910, for example to reunify the combined shape 910 back to the original unsplit state. That is, the relevant portions of the combined shape 910 (i.e., relevant portions of the sub-shapes 705 and 706) within the combined shape 910 are aligned with their corresponding shape 702, in its original unsplit state. As such, when an editing platform generates the combined shape 910 that may look unnatural, the post-split unilateral fixer 227 makes corrections to the combined shape 910 to make it look more natural. For example, the unilateral fixer 227 outputs the combined shape that is corrected 915, that is aligned with the original unsplit state of shape 702 (e.g., exhibiting an expression having a smile).

In one embodiment, the correction that is applied to the combined shape is weighted. The weighting of the correction is based on weighted activations of the first shape and the second shape. FIGS. 9B-9C illustrate the application of weighted corrections, in accordance with embodiments of the present disclosure. That is, FIGS. 9B-C illustrates the splitting of a shape into left and right sub-shapes, the activations of the sub-shapes with varying weights, and the application of a corresponding weighted correction when the sub-shapes are combined, wherein the weighted correction may be determined using an artificial intelligence model configured to identify and classify corrections when combining shapes and or sub-shapes.

In particular, FIG. 9B illustrates the combining of sub-shape 705 or Lip Corner Puller left, and sub shape 902 or Lip Corner Puller right to generate a combined shape 905. Each of the sub-shapes may have an activation weight, as indicated in table 920. In particular, sub-shape 705 or Lip Corner Puller left has an activation weight of 1.0 (e.g., the highest), and sub-shape 902 or Lip Corner Puller right has an activation weight of 0.2. In embodiments, activation weights can be over any selectable range, such as 0 to 1, or 0 to any number, or range between two numbers, etc. The correction that is applied to the combined shape 905 is weighted based on the weighted activations of the two shapes. In one embodiment, the weight of the correction is determined by multiplying each of the weighted activation together. Other calculations of the weight are supported in other embodiments. For example, for a given correction that is applied to the combined shape 905, as previously described, the application of the correction is weighted to 0.2. That is, the weight of the correction that is applied is 0.2. As such, twenty percent of the correction is applied to the combined shape 905 based on the weighted activations of sub-shapes 705 and 902.

For comparison, FIG. 9C provides an example having different activation weights for the corresponding sub-shapes. In particular, FIG. 9C illustrates the combining of the same sub-shape 705 or Lip Corner Puller left, and sub shape 902 or Lip Corner Puller right to generate a combined shape 906. Each of the sub-shapes may have an activation weight, as indicated in table 930. In particular, sub-shape 705 or Lip Corner Puller left has an activation weight of 0.7, and sub-shape 902 or Lip Corner Puller right has an activation weight of 0.2. The correction that is applied to the combined shape 906 is weighted based on the weighted activations of the two shapes. In one embodiment, the weight of the correction is determined by multiplying each of the weighted activation together. Other calculations of the weight are supported in other embodiments. For example, for a given correction that is applied to the combined shape 906, as previously described, the application of the correction is weighted to 0.14. That is, the weight of the correction that is applied is 0.14. As such, approx. 14 percent of the correction is applied to the combined shape 906 based on the weighted activations of sub-shapes 705 and 902.

In one embodiment, a sub-shape (e.g., wire frame or UV map) may be modified using an editing platform. That is, the modifications may go beyond a weighted activation, such as manipulation of vertices within a wire mesh and/or UV map. The sub-shape that is modified is combined with one or more sub-shapes of remaining portions of the shape (e.g., corresponding to remaining weight maps in a plurality of weight maps) to generate a combined shape. A correction is applied to the combined shape to align the combined shape with the original unsplit shape.

FIG. 10 illustrates the splitting of different shapes with different expressions into sub-shapes, and the application of a correction when combining sub-shapes having different expressions, in accordance with one embodiment of the disclosure. For example, two or more sub-shapes generated from different shapes are combined to generate a combined shape, such as when combining different expressions (i.e., portions thereof) on different sides of a split (e.g., different sides of a face that is split in half along a central vertical line). In one embodiment, the correction may be determined using an artificial intelligence model configured to identify and classify corrections when combining shapes and or sub-shapes, in accordance with one embodiment of the disclosure. For example, the application of corrections may be performed by the post-split contralateral combiner 225 of the post-split engine 220 of FIG. 2, in one embodiment.

As shown, shape 701 exhibits expression "Y", which may be defined as a Lip Pucker (AU 18) expression. The shape 701 may be split into sub-shape 703 exhibiting the right side or portion of shape 701. In that manner, sub shape 703 allows for isolated control of the right side of a lip that is puckered. Also, shape 702 exhibits expression "Z", or the Lip Corner Puller (AU 12) expression, or more generally a smile. The shape 702 may be split into sub-shape 705 exhibiting the left side or portion of the shape 702. In that manner, sub-shape 705 allows for isolated control of the left side of the smile. Generation of the sub-shapes 703 and 705 may be performed by split-shape generator 210, previously introduced in FIG. 2. Further, modifications to the split-shapes 703 and 705 may be performed using an editing platform, as previously described.

The post-split contralateral combiner 225 is configured to combine two or more sub-shapes generated from different shapes to generate a combined shape, such as when combining different expressions (i.e., portions thereof) on different sides of a split (e.g., different sides of a face that is split in half along a central vertical line). In particular, the term contralateral refers to different expressions for different sides of a face. The post-split contralateral combiner 225 is configured to combine shapes, sub-shapes, or a combination thereof to generate the combined shape. Also, portions of one or more expressions on different sides of face may be manipulated and/or combined using the combiner. As shown, the post-split contralateral combiner 225 combines sub-shape 703 and sub-shape 705 into a combined shape 1010 (including half expressions Y-r and Z-l). In one embodiment, one or more of the sub-shapes 703 and/or 705 may be further modified using an editing platform before or during implementation of the combining process.

The combined shape 1010 is further manipulated by the post-split unilateral fixer 227 that is configured to apply a correction to the combined shape 1010, for example to reunify portions of the combined shape 1010 back to respective unsplit states of corresponding shapes. That is, the relevant portions of the combined shape 1010 (i.e., relevant portions of the sub-shapes 703 and 705) within the combined shape 1010 are aligned with their respective shapes 701 and 702, in their original unsplit state. As such, when an editing platform generates the combined shape 1010 that may look unnatural, the post-split unilateral fixer 227 makes corrections to the combined shape 1010 to make it look more natural. For example, the unilateral fixer 227 outputs the combined shape that is corrected 1015, that is aligned with one or more of the original unsplit states of shapes 701 and 702 (e.g., exhibiting expression of a lip pucker and a smile).

FIG. 11 illustrates the combining of different shapes having different facial expressions, and the application of a correction to the combined shape, wherein the correction may be identified using an artificial intelligence model configured to identify corrections when combining shapes and or sub-shapes, in accordance with one embodiment of the disclosure. For example, two or more shapes are combined to generate a combined shape, such as when combining different full expressions. In one embodiment, the correction may be determined using an artificial intelligence model configured to identify and classify corrections when combining shapes and or sub-shapes, in accordance with one embodiment of the disclosure. For example, the application of corrections may be performed by the post-split combiner 223 or the post-split contralateral combiner 225 of the post-split engine 220 of FIG. 2, in embodiments.

As shown, shape 701 exhibits expression "Y", which may be defined as the Lip Pucker (AU 18) expression. Selection and/or identification of shape 701 may be performed by split-shape generator 210. Shape 701 allows for modification to the entire shape, such that modification of one vertex will affect other vertices in shape 701. Also, shape 702 exhibits expression "Z", or the Lip Corner Puller (AU 12) expression, or more generally a smile. Selection and/or identification of shape 702 may be performed by split-shape generator 210. Shape 702 allows for modification to the entire shape, such that modification of one vertex will affect other vertices in shape 702. Further, modifications to the shapes 701 and 702 may be performed using an editing platform, as previously described.

The post-split combiner 223 and/or the post-split contralateral combiner 225 (collectively referred to as combiner 223/225) may be configured to combine two or more shapes to generate a combined shape, such as when combining different expressions. The combiner 223/225 is configured to combine shapes, sub-shapes, or a combination thereof to generate the combined shape. In particular, one or more expressions on different shapes (e.g. of a face) may be manipulated and/or combined using the combiner 223/225. As shown, the combiner 223/225 combines shape 701 and shape 702 into a combined shape 1110 (including a combination of expressions "Y" and "Z"). A representation of the facial expression of the combined shape 1110 is shown as an output of combiner 223/225. In one embodiment, one or more of the shapes 701 and 702 may be further modified using an editing platform before or during implementation of the combining process.

The combined shape 1110 is further manipulated by the post-split unilateral fixer 227 that is configured to apply a correction to the combined shape 1110, for example to reunify the combined shape 1010 back to one or more of the unsplit states of original shapes 701 and 702. That is, the relevant portions of the combined shape 1010 within the combined shape 1110 may be aligned with their respective shapes 701 and 702, in their original unsplit state. As such, when an editing platform generates the combined shape 1110 that may look unnatural, the post-split unilateral fixer 227 makes corrections to the combined shape 1110 to make it look more natural. For example, the unilateral fixer 227 outputs the combined shape that is corrected 1115, that is aligned with one or more of the original unsplit states of shapes 701 and 702 (e.g., exhibiting expression of a lip pucker and a smile).

In one embodiment, the combined shape 1110 without corrections and the combined shape with corrections 1115 may be presented in a manner suitable for comparison. For example, a toggle icon may be selected to toggle back and forth between the two shapes, in one embodiment. For example, FIG. 11 shows images and/or representations of each of the shapes 1110 (without correction) and 1115 (with correction), wherein the shapes may be shown one at time as controlled by a toggle icon. In another embodiment, the combined shape 1110 without corrections and the combined shape with corrections 1115 may be presented simultaneously (e.g., side by side) for comparison purposes.

Figure 12:
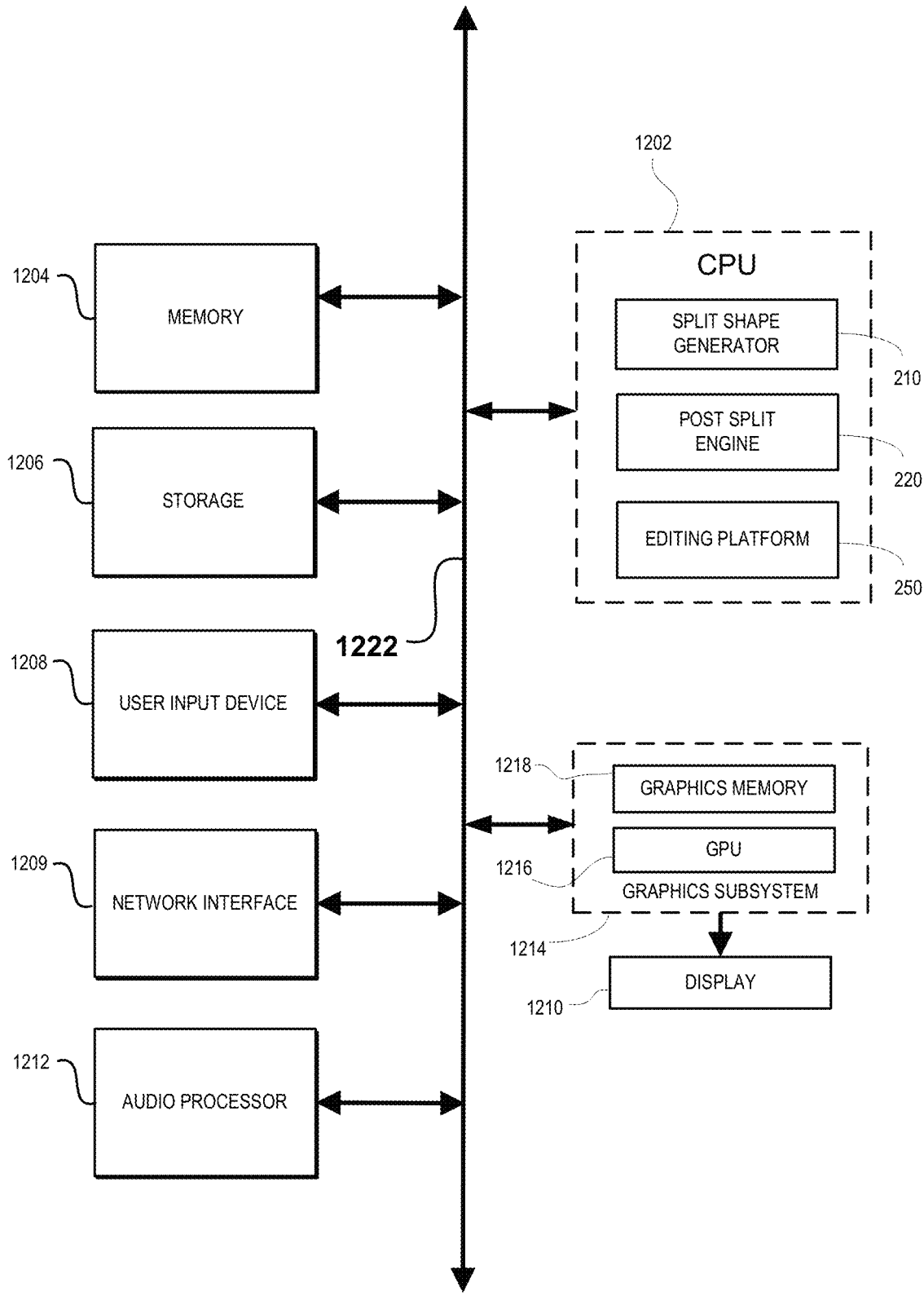
FIG. 12 illustrates components of an example device that can be used to perform aspects of the various embodiments of the present disclosure.

FIG. 12 illustrates components of an example device 1200 that can be used to perform aspects of the various embodiments of the present disclosure. For example, FIG. 12 illustrates an exemplary hardware system suitable for classifying corrections that can be applied to combined shapes, in accordance with embodiments of the present disclosure. This block diagram illustrates a device 1200 that can incorporate or can be a personal computer, a server computer, gaming console, mobile device, or other digital device, each of which is suitable for practicing an embodiment of the invention. Device 1200 includes a central processing unit (CPU) 1202 for running software applications and optionally an operating system. CPU 1202 may be comprised of one or more homogeneous or heterogeneous processing cores.

In accordance with various embodiments, CPU 1202 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

CPU 702 may be configured to implement split-shape generator 210, a post-split engine 220, and an editing platform 250. As previously described, the split-shape generator 210 is configure for splitting a shape of an object into unique off-center and customized sub-shapes that can be used for editing and combining. The post-split engine is configured for performing post-split corrections to shapes and sub-shapes of different expressions that are combined. The editing platform 250 provides for editing features used for manipulating and generating shapes that are typically found within the animation industry.

Memory 1204 stores applications and data for use by the CPU 1202 and GPU 1216. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate user inputs from one or more users to device 1200, examples of which may include keyboards, mice, joysticks, touch pads, touch screens, still or video recorders/cameras, and/or microphones. Network interface 1209 allows device 1200 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of device 1200, including CPU 1202, graphics subsystem 1214 including GPU 1216, memory 1204, data storage 1206, user input devices 1208, network interface 1209, and audio processor 1212 are connected via one or more data buses 1222.

A graphics subsystem 1214 is further connected with data bus 1222 and the components of the device 1200. The graphics subsystem 1214 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1216, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs. In one embodiment, GPU 1216 may be implemented within an AI engine (e.g., machine learning engine 190) to provide additional processing power, such as for the AI, machine learning functionality, or deep learning functionality, etc.

The graphics subsystem 1214 periodically outputs pixel data for an image from graphics memory 1218 to be displayed on display device 1210, or to be projected by a projection system (not shown). Display device 1210 can be any device capable of displaying visual information in response to a signal from the device 1200, including CRT, LCD, plasma, and OLED displays. Device 1200 can provide the display device 1210 with an analog or digital signal, for example.

In other embodiments, the graphics subsystem 1214 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for splitting a shape of an object into unique off-center and customized sub-shapes that can be used for editing and combining, and for performing post-split corrections to shapes and sub-shapes of different expressions that are combined.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
generating a three dimensional (3D) wire frame of a shape that corresponds to an expression of a face, wherein the shape includes a feature;
generating a UV map that corresponds to the 3D wire frame;
identifying an isolated area of the shape using vertex weights in the 3D wire frame or the UV map, wherein the isolated area corresponds to a portion of the face;
generating a weight map based on the vertex weights in the 3D wire frame or the UV map, wherein the weight map splits the isolated area from a remaining area of the shape to isolate movement of a first section of the feature in the isolated area from movement of a second section of the feature in the remaining area, wherein the feature of the shape is located in the isolated area and the remaining area; and
generating a sub-shape of the shape in the 3D wire frame or the UV map corresponding to the isolated area based on the weight map,
wherein the sub-shape in the 3D wire frame or the UV map is editable using an editing application.

2. The method of claim 1, wherein the identifying the isolated area of the shape includes:
painting a plurality of vertex weights of a plurality of vertices in the 3D wire frame; or
painting the plurality of vertex weights of the plurality of vertices in the UV map.

3. The method of claim 2, further comprising:
painting a falloff between the isolated area of the shape and areas outside of the isolated area using the plurality of vertex weights of the plurality of vertices of the 3D wire frame or UV map, wherein the plurality of vertex weights corresponds to a plurality of shades of a first color or a second color.

4. The method of claim 1, further comprising:
identifying the isolated area of the shape in the weight map using a first color; and
identifying areas outside of the isolated area of the shape in the weight map using a second color.

5. The method of claim 1, further comprising:
generating a plurality of weight maps based on at least the weight map,
wherein the plurality of weight maps identifies a plurality of isolated areas of the shape.

6. The method of claim 5, further comprising:
generating a base set of weight maps from the plurality of weight maps,
wherein the plurality of weight maps includes a first weight map identifying a left or a right portion of the face, and a second weight map identifying a top or a bottom portion of the face,
wherein the base set of weight maps identifies:
the left portion of the face,
the right portion of the face,
the top portion of the face,
the bottom portion of the face,
a top left portion of the face,
a top right portion of the face, a bottom left portion of the face, and a bottom right portion of the face.

7. The method of claim 5, further comprising:
modifying the weight map; and
regenerating the plurality of weight maps based on the weight map that is modified.

8. The method of claim 5, further comprising:
modifying the sub-shape within the editing application using a first 3D wire frame or first UV map each corresponding to the sub-shape;
generating a combined shape by combining the sub-shape that is modified with one or more sub-shapes corresponding to remaining weight maps in the plurality of weight maps; and
aligning the combined shape with the shape that corresponds to the expression.

9. The method of claim 5, further comprising:
generating a combined shape by combining a plurality of sub-shapes corresponding to the plurality of weight maps; and
aligning the combined shape with the shape that corresponds to the expression.

10. A non-transitory computer-readable medium storing a computer program for performing a method, the computer-readable medium comprising:
program instructions for generating a three dimensional (3D) wire frame of a shape that corresponds to an expression of a face, wherein the shape includes a feature;
program instructions for generating a UV map that corresponds to the 3D wire frame;
identifying an isolated area of the shape using vertex weights in the 3D wire frame or the UV map, wherein the isolated area corresponds to a portion of the face;
program instructions for generating a weight map based on the vertex weights in the 3D wire frame or the UV map, wherein the weight map splits the isolated area from a remaining area of the shape to isolate movement of a first section of the feature in the isolated area from movement of a second section of the feature in the remaining area, wherein the feature of the shape is located in the isolated area and the remaining area; and
program instructions for generating a sub-shape of the shape in the 3D wire frame or the UV map corresponding to the isolated area based on the weight map,
wherein the sub-shape in the 3D wire frame or the UV map is editable using an editing application.

11. The non-transitory computer-readable medium of claim 10, wherein the program instructions for identifying the isolated area of the shape includes:
program instructions for painting a plurality of vertex weights of a plurality of vertices in the 3D wire frame; or
program instructions for painting the plurality of vertex weights of the plurality of vertices in the UV map.

12. The non-transitory computer-readable medium of claim 11, further comprising:
program instructions for painting a falloff between the isolated area of the shape and areas outside of the isolated area using the plurality of vertex weights of the plurality of vertices of the 3D wire frame or UV map, wherein the plurality of vertex weights corresponds to a plurality of shades of a first color or a second color.

13. The non-transitory computer-readable medium of claim 10, further comprising:
program instructions for generating a plurality of weight maps based on at least the weight map,
wherein the plurality of weight maps identifies a plurality of isolated areas of the shape.

14. The non-transitory computer-readable medium of claim 13, further comprising:
program instructions for modifying the sub-shape within the editing application using a first 3D wire frame or first UV map each corresponding to the sub-shape;
program instructions for generating a combined shape by combining the sub-shape that is modified with one or more sub-shapes corresponding to remaining weight maps in the plurality of weight maps; and
program instructions for aligning the combined shape with the shape that corresponds to the expression.

15. The non-transitory computer-readable medium of claim 13, further comprising:
program instructions for generating a combined shape by combining a plurality of sub-shapes corresponding to the plurality of weight maps; and
program instructions for aligning the combined shape with the shape that corresponds to the expression.

16. A computer system comprising:
a processor;
memory coupled to the processor and having stored therein instructions that, if executed by the computer system, cause the computer system to execute a method, comprising:
generating a three dimensional (3D) wire frame of a shape that corresponds to an expression of a face, wherein the shape includes a feature;
generating a UV map that corresponds to the 3D wire frame;
identifying an isolated area of the shape using vertex weights in the 3D wire frame or the UV map, wherein the isolated area corresponds to a portion of the face;
generating a weight map based on the vertex weights in the 3D wire frame or the UV map, wherein the weight map splits the isolated area from a remaining area of the shape to isolate movement of a first section of the feature in the isolated area from movement of a second section of the feature in the remaining area, wherein the feature of the shape is located in the isolated area and the remaining area; and
generating a sub-shape of the shape in the 3D wire frame or the UV map corresponding to the isolated area based on the weight map,
wherein the sub-shape in the 3D wire frame or the UV map is editable using an editing application.

17. The computer system of claim 16, wherein the identifying the isolated area of the shape in the method includes:
painting a plurality of vertex weights of a plurality of vertices in the 3D wire frame; or
painting the plurality of vertex weights of the plurality of vertices in the UV map.

18. The computer system of claim 16, the method further comprising:
generating a plurality of weight maps based on at least the weight map,
wherein the plurality of weight maps identifies a plurality of isolated areas of the shape.

19. The computer system of claim 18, the method further comprising:
modifying the sub-shape within the editing application using a first 3D wire frame or first UV map each corresponding to the sub-shape;

generating a combined shape by combining the sub-shape that is modified with one or more sub-shapes corresponding to remaining weight maps in the plurality of weight maps; and aligning the combined shape with the shape that corresponds to the expression.

20. The computer system of claim 18, the method further comprising:

generating a combined shape by combining a plurality of sub-shapes corresponding to the plurality of weight maps; and aligning the combined shape with the shape that corresponds to the expression.

\* \* \* \* \*